(12) United States Patent
Gardner

(10) Patent No.: US 7,203,822 B2
(45) Date of Patent: Apr. 10, 2007

(54) UNPRIVILEGED CONTEXT MANAGEMENT

(75) Inventor: Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 10/909,802

(22) Filed: Jul. 31, 2004

(65) Prior Publication Data

US 2006/0026406 A1    Feb. 2, 2006

(51) Int. Cl.
 *G06F 9/48* (2006.01)
(52) U.S. Cl. .................................... 712/228
(58) Field of Classification Search ................. 712/228
 See application file for complete search history.

(56) References Cited

U.S. PATENT DOCUMENTS

| | | | | |
|---|---|---|---|---|
| 5,937,186 A * | 8/1999 | Horiguchi et al. | ........... | 712/244 |
| 6,367,005 B1 * | 4/2002 | Zahir et al. | .............. | 712/228 |
| 6,934,939 B2 * | 8/2005 | Ewart et al. | ............... | 717/152 |
| 2002/0099932 A1 * | 7/2002 | Muro, Jr. | ............... | 712/228 |
| 2004/0019744 A1 * | 1/2004 | Boucher | ............... | 711/132 |

\* cited by examiner

*Primary Examiner*—Eric Coleman
(74) *Attorney, Agent, or Firm*—Richard P. Lange

(57) ABSTRACT

Embodiments of the present invention provide full benefit of the cover instruction provided by the Intel IA-64 architecture to code running at less than highest privilege level. In one embodiment of the present invention, prior to execution of a cover instruction by non-privileged code, the code obtains and stores the contents of the current-frame-marker register in memory. Then, the code executes a cover instruction to obtain a new, empty register stack frame and to relegate the registers of previously allocated stack frames to the dirty-register status. Subsequently, the processor state represented by the register values of the stack frame that was current when the cover instruction was executed can be recovered by first executing another cover instruction, computing a previous-frame-marker-register value and placing the computed value into the previous-frame-marker register, executing a first branch (br.ret) return instruction, moving the saved contents of the current-frame-marker register from memory into the previous-frame-marker register, and executing a second branch return instruction.

10 Claims, 34 Drawing Sheets

UNPRIVILEGED CONTEXT MANAGEMENT

TECHNICAL FIELD

The present invention relates to computer and software architecture and, in particular, to a method for employing modern computer architectures for efficient context switching in a multi-threaded, non-privileged application environment and for effective use of the cover instruction by non-privileged code.

BACKGROUND OF THE INVENTION

The Intel® IA-64, or IPF, processor architecture provides a relatively spectacular increase in machine resources and hardware features for supporting modem operating-system and software program development. The IA-64 architecture provides, for example, a register stack engine functionality that automatically stores the contents of registers to backing-store memory and reloads the contents of registers from backing-store memory upon routine calls and termination of called routines, respectively. The RSE manages a circular buffer of general purpose registers on which register stack frames are allocated for called routines and de-allocated when the called routines complete execution and return control to a calling routine. The IA-64 architecture provides architectural support for interrupt handlers to optionally allocate new register stack frames when register resources greater than the non-stacked and banked registers available to interrupt handlers are needed. To facilitate register-stack management by interrupt handlers and other privileged code, the IA-64 architecture provides a cover instruction, which has the effect of allocating a new, empty register stack frame, and relegating registers of most recently allocated stack frames to dirty-register status, allowing the register stack engine to automatically spill their contents to backing-store memory. The cover instruction has additional side effects, explained below, in a subsequent subsection, that accrue under certain conditions obtainable only by privileged code. These side effects are useful for register stack management. The cover instruction is not a privileged instruction, and can be executed by non-privileged code. However, the useful side effects of the instruction do not occur when the cover instruction is executed by unprivileged code, limiting the direct usefulness of the cover instruction for register stack management by non-privileged code. Software-program developers have therefore recognized a need for a method to allow non-privileged code to obtain the full benefits of the cover instruction.

SUMMARY OF THE INVENTION

Embodiments of the present invention provide full benefit of the cover instruction provided by the Intel IA-64 architecture to code running at less than highest privilege level. In one embodiment of the present invention, prior to execution of a cover instruction by non-privileged code, the code obtains and stores the contents of the current-frame-marker register in memory. Then, the code executes a cover instruction to obtain a new, empty register stack frame and to relegate the registers of previously allocated stack frames to the dirty-register status. Subsequently, the processor state represented by the register values of the stack frame that was current when the cover instruction was executed can be recovered by first executing another cover instruction, computing a previous-frame-marker-register value and placing the computed value into the previous-frame-marker register, executing a first branch (br.ret) return instruction, moving the saved contents of the current-frame-marker register from memory into the previous-frame-marker register, and executing a second branch return instruction.

DETAILED DESCRIPTION OF THE INVENTION

Various embodiments of the present invention involve methods for using the cover instruction, provided by the Intel IA-64 architecture, by non-privileged code to achieve the beneficial side effects directly provided by the cover instruction to privileged code under certain circumstances obtainable only by privileged code. To facilitate understanding of the present invention, in a first subsection, below, specific, detailed description of various aspects of the Intel IA-64 architecture are first provided. Then, in a second, following subsection, embodiments of the present invention are presented.

Figure 1A:
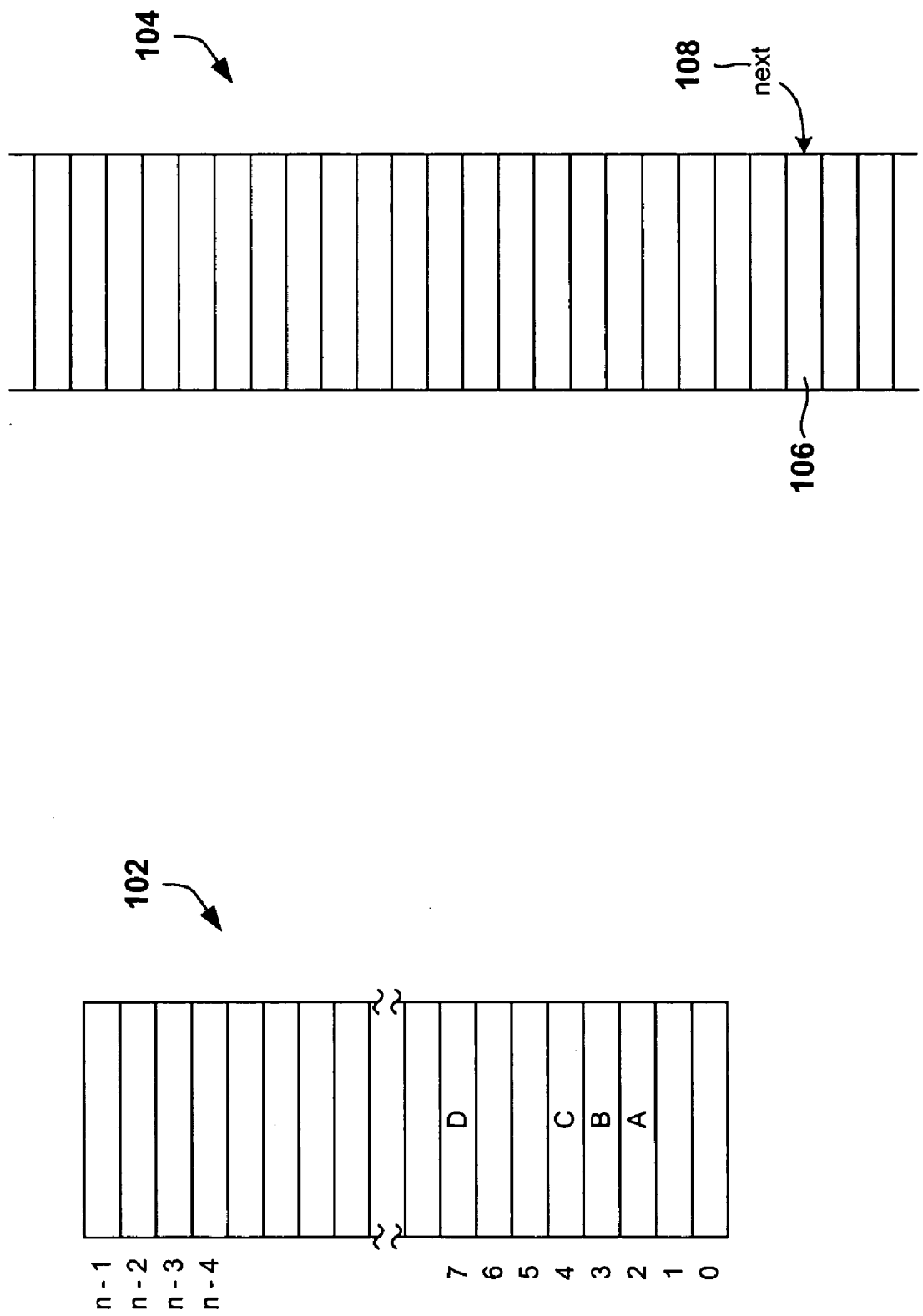
FIGS. 1A–F illustrate a generalized method for saving state on a system stack by a first routine during a call by the first routine to a second routine.

Overview of Register-Stacking-Related Aspects of the Intel IA-64 Architecture FIGS. 1A–F illustrate a generalized method for saving state on a system stack by a first routine during a call by the first routine to a second routine. FIG. 1A uses the same illustration conventions as FIGS. 1B–F. In FIG. 1A, n general registers 102 available for use by a process are shown in a column starting with register $r_0$ and ending with register $r_{n-1}$. FIG. 1A also shows a series of sequentially addressed words 104 in the memory that serve as a system stack in which the values of registers are stored and retrieved by executing processes. The next available memory word for pushing a register value onto the stack is marked, in FIG. 1A, and in subsequent figures, by a next pointer 108. In general, one of the general purpose registers $r_0$ through $r_{n-1}$ is designated, by convention, to store a pointer to the next available memory location into which a register value may be pushed. In other words, a selected register is employed to store the next pointer. In FIG. 1A, a number of symbolic values A, B, C, D are shown stored in registers r2, r3, r4, and r7, respectively. These values have been stored in the registers by the currently executing procedure. The remaining registers may also contain values stored by the currently executing procedure or by previously executing procedures, but these values are temporary, or scratch, values no longer needed by the currently executing procedure or by previously executing procedures.

In the relatively general and simple architecture employed in FIGS. 1A–F, there is one, single set of general purpose registers that define the current state of the processor and that are time multiplexed on behalf of multiple, concurrently running processes and shared by various routines that are invoked and execute within the context of a single process or thread. Therefore, when a currently executing routine invokes a next routine via a routine call, any values currently stored in registers that will be needed by the currently executing routine following return of the called routine need to be saved in memory, so that the called routine can freely use the set of general registers during the called routine's execution. Registers are essentially a very small, but extremely fast set of memory resources within the processor, used for locally storing values generated and manipulated by execution of instructions on the processor. In addition, certain special registers hold values that control and define various aspects of processor behavior. For example, in most computer architectures, one special register holds the memory address of the next instruction to be fetched and executed by the processor, commonly referred to as the instruction pointer ("IP") register, and another register contains numerous bits and bit fields that define various aspects of processor behavior, commonly referred to as the processor status register ("PSR").

The exact method by which registers are saved and restored when one routine invokes another routine, and when an invoked routine completes execution and returns control to the invoking routine, are somewhat arbitrary, and are encoded in compilers used to compile high-level programs into machine code. In some systems, for example, it is the responsibility of the calling routine to save register values prior to invoking another routine and to restore register values following completion of the called routine. In other systems, it is the called routine's responsibility to store and restore register values. In yet other systems, the calling routine stores the register values, and the register values are restored as a part of the return of control from the called routine to the calling routine.

FIGS. 1B–F illustrate one of numerous possible schemes for storing register values upon routine invocation and restoring register values upon invoked routine termination. In the example illustrated in FIGS. 1A–F, the calling routine stores any register values that the calling routine needs to preserve for use following completion of a routine call in a system-stack data structure in memory. To store a register value on the stack, an operation commonly referred to as pushing the value onto the stack, the calling routine moves the contents of the register to the memory location referenced by the next pointer, and increments the contents of the next pointer to point to either the next-largest memory location or the next-smallest memory location, depending on whether the stack grows in the direction of higher memory addresses or in the direction of lower memory addresses. In general, the general purpose registers have a fixed length, in bits, equal to the size of the natural word employed in the computer architecture. In other words, each register stores a natural word, and each memory location also stores a natural word. In many existing computer systems, the natural words size is 32 bits, and memory is byte addressable, so that the numerical values stored in the next pointer increase by four with each push and pop operation. In newer architectures, a 64-bit word size is used, and memory may be byte, 16-bit short word, 32-bit word, or 64-bit long word addressable. Values are removed from the system stack, an operation commonly referred to as popping a value from the stack, by moving the contents of the memory location immediately preceding or following the memory location currently referenced by the next pointer, depending on whether the stack grows towards higher memory addresses or towards lower memory addresses, into a register and decreasing or increasing the value in the next pointer by an amount needed to reference the immediately preceding or immediately following memory location, again depending on whether the stack grows towards higher memory addresses or towards lower memory addresses.

Figure 1B:
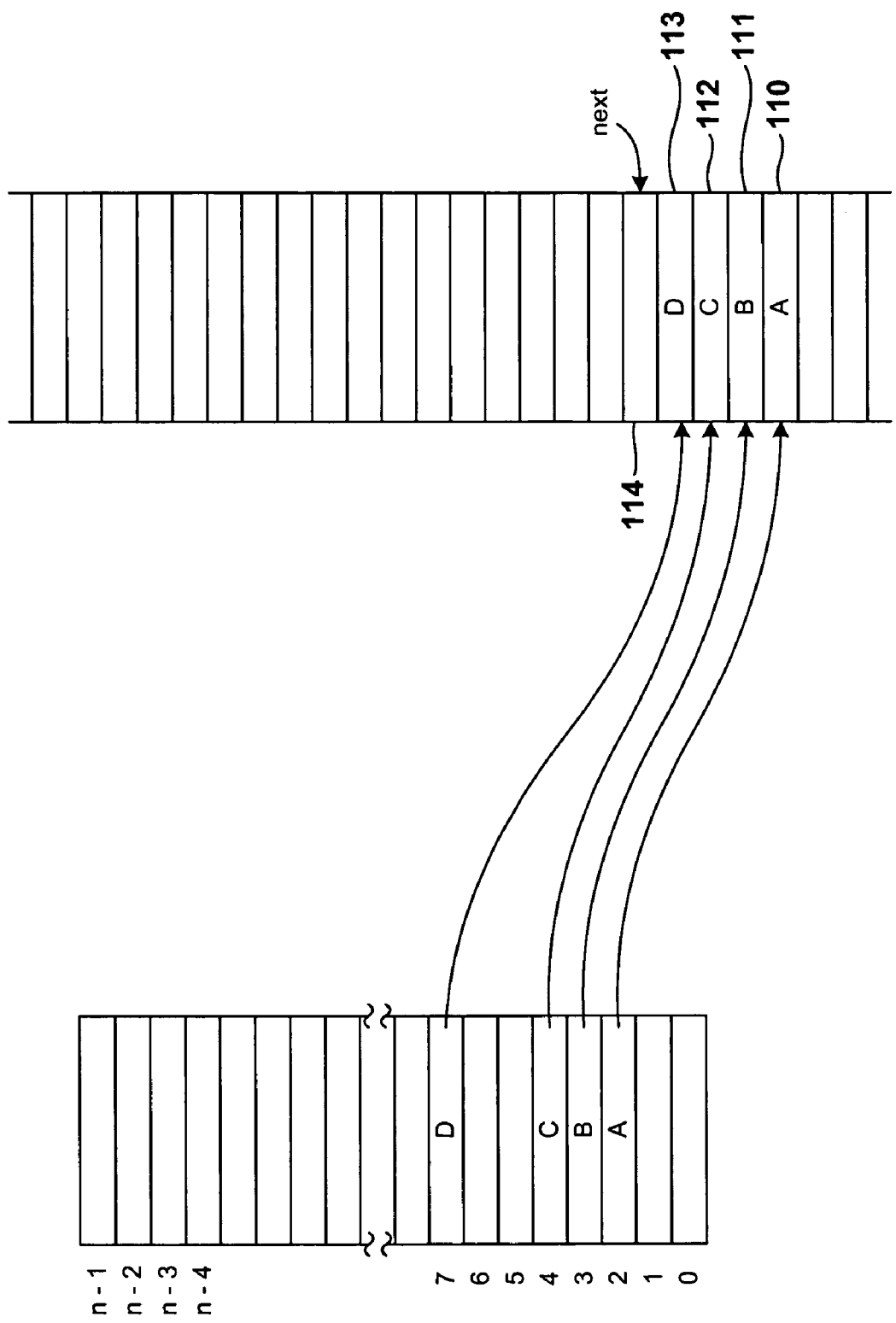
Figure 1C:
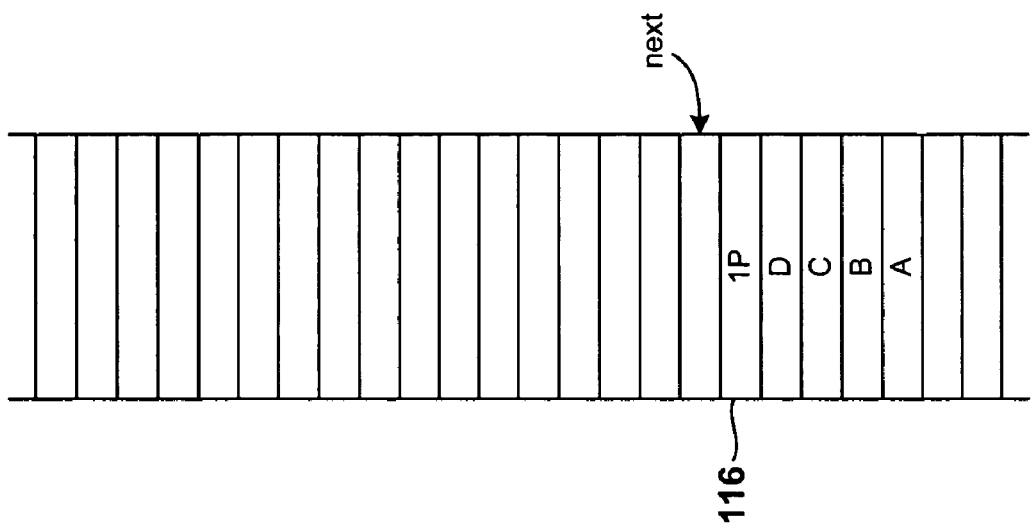
Figure 1C:
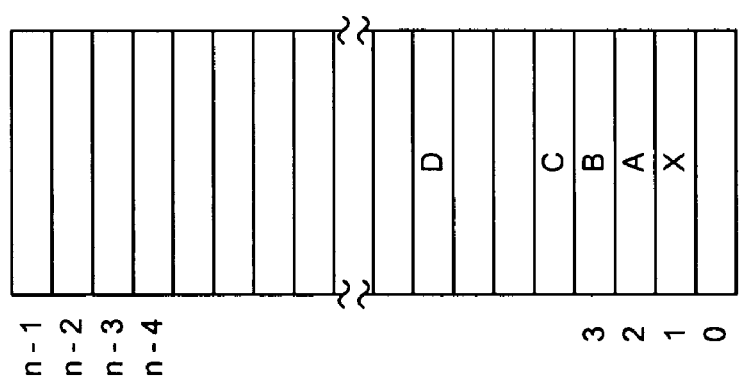
Figure 1D:
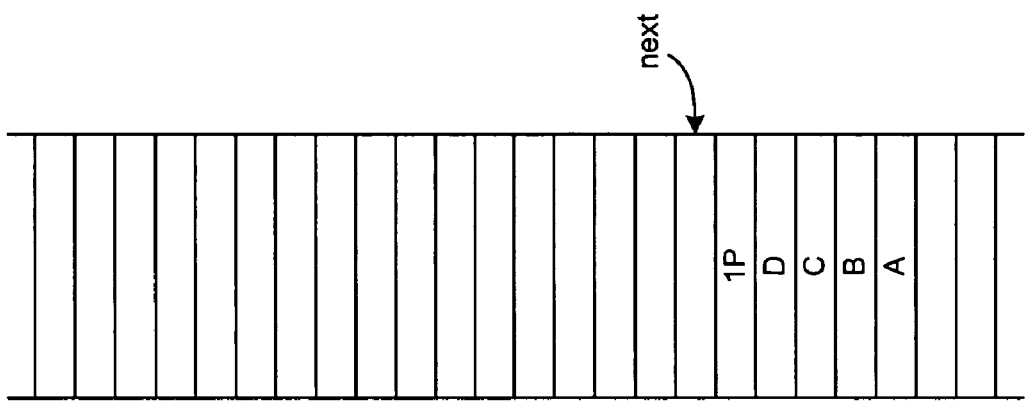
Figure 1D:
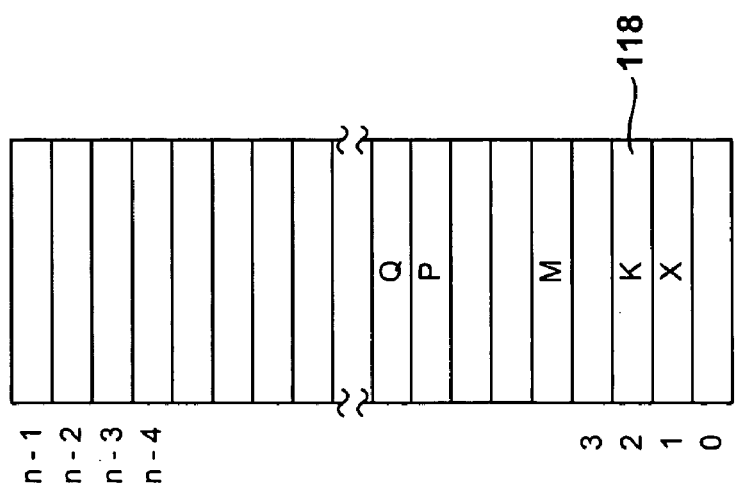

As shown in FIG. 1B, the currently executing routine prepares to call a different routine by saving values stored in registers $r_2$, $r_3$, $r_4$, and $r_7$ into the system stack via four push operations. Execution of the four push operations results in the values stored in registers $r_2$, $r_3$, $r_4$, and $r_7$ placed into memory locations 110–113, respectively. The next pointer has been correspondingly incremented to now point to the next free memory location 114. It is important to note that, in the convention illustrated in FIGS. 1B–F, it is the calling routine's responsibility to store any values maintained in registers that are needed subsequent to a routine call into the system stack, and to subsequently restore those values following the routine call. Next, as shown in FIG. 1C, the calling routine pushes the contents of the IP register onto the stack 116. Finally, control is transferred to the called routine, which begins executing and storing values into the general purpose registers, as illustrated in FIG. 1D. For example, the called routine has overwritten the value "A," previously stored in register $r_2$, with the symbolic value "K" 118. In the case that the calling routine furnishes arguments, or parameters, to the called routine, those parameters may be placed into a particular set of registers that, by convention, are assumed by the called routine to contain the parameters or arguments. Thus, for example, the called routine, currently executing in the state shown in FIG. 1D, may access the symbolic value "X" stored in register $r_1$ by the calling routine prior to invocation of the called routine.

Figure 1E:
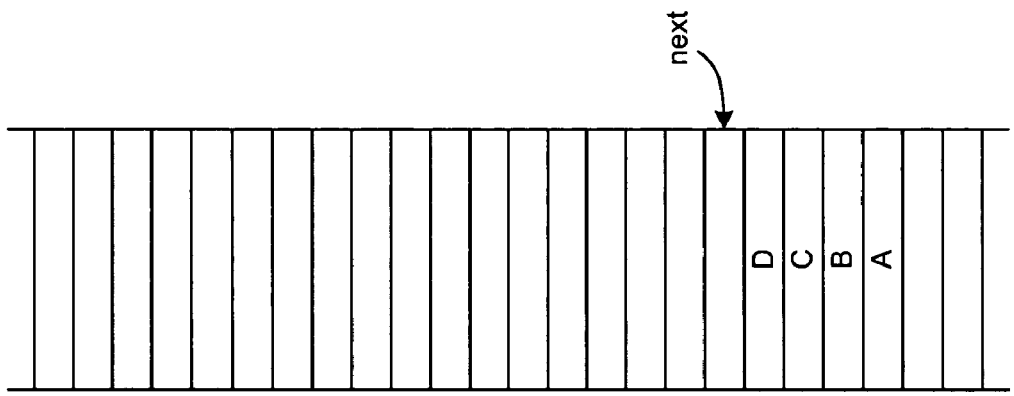
Figure 1E:
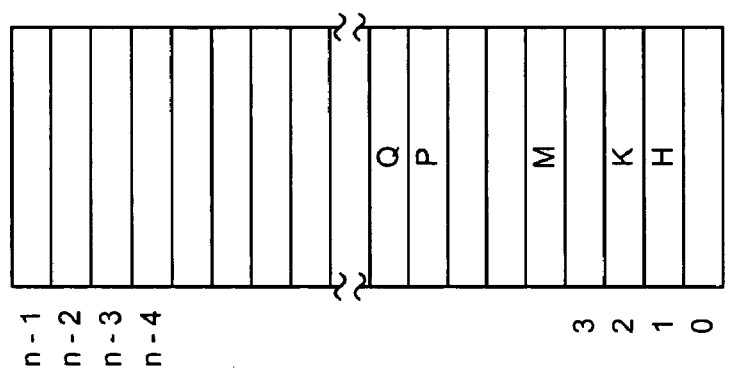
Figure 1F:
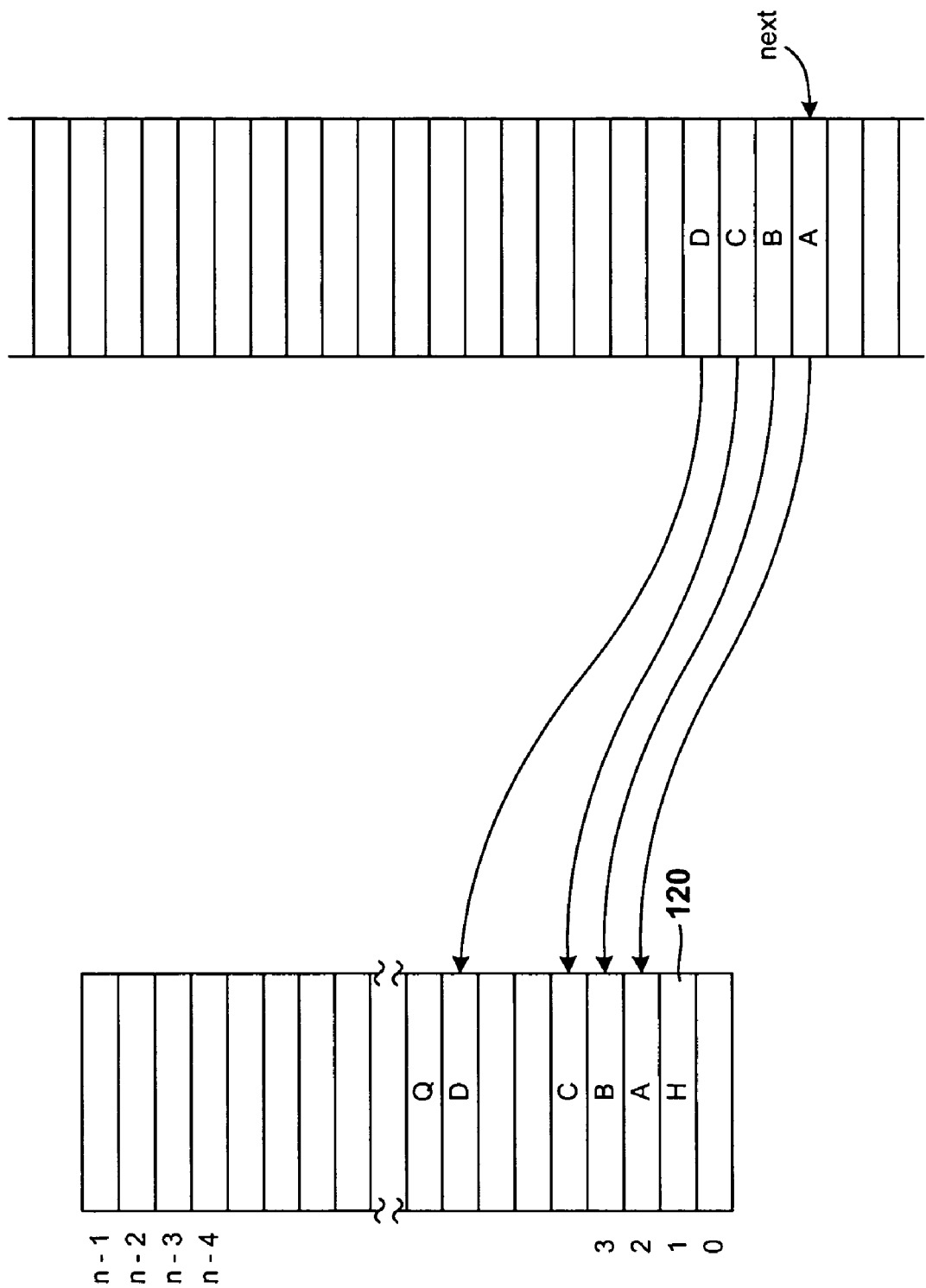

When the called routine terminates, the processor needs to be directed to return control to the instruction in the calling routine following the branch instruction or call instruction that invoked the called routine. This is accomplished, as shown in FIG. 1E, by popping the value of the IP register from the system stack and placing the saved IP value into the IP register. Control is then effectively transferred back to the calling routine which, as shown in FIG. 1F, can now pop the saved values of registers $r_2$, $r_3$, $r_4$, and $r_7$ from the system stack in order to restore the values of registers $r_2$, $r_3$, $r_4$, and $r_7$ prior to proceeding with subsequent computation. Note that the called routine can return values to the calling routine via one or more general purpose registers. For example, the calling routine has overwritten the symbolic value "X" stored into register $r_1$ by the calling routine with the symbolic value "H" 120, which is now accessible by the calling routine.

A system stack data structure is employed because routine calls may be deeply nested, with the machine state, as represented by values stored in registers, stored in successive blocks, or frames, on the system stack, with stacked frames retrieved in opposite order from the order in which they are stacked. The maximum nesting level for routine calls is bounded only by the amount of memory devoted to the system stack, and, of course, by the size of the stack frames needed for storing the state of each routine.

In modern computing, execution of even moderately complex programs can lead to very deep nesting of routine calls and stacking of very large numbers of stack frames onto the system stack. Each register store and restore operation costs valuable processor cycles, decreasing the processor bandwidth available for other calculations. Therefore, much effort has been devoted in program-language design and compiler design to efficiently using the system stack for saving register state during routine calls and during transfer of control from terminating called routines back to calling routines.

In the relatively recent Intel IA-64 processor architecture, also referred to as IPF and Itanium, a significant amount of architectural support is devoted to facilitating register store and restore operations during routine calls and transfer of control from completed routines back to calling routines This architectural support is next described.

Figure 2:
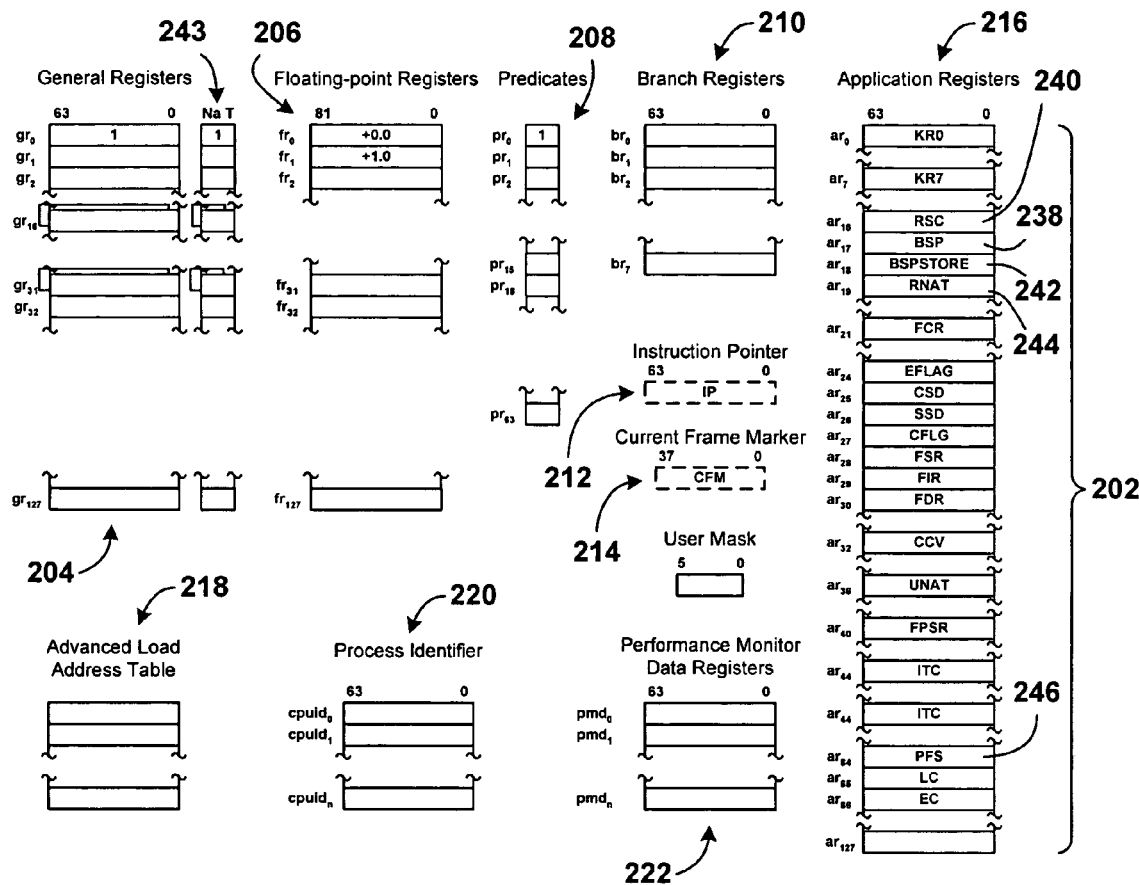
FIG. 2 shows the registers provided in the IA-64 architecture.
Figure 2:
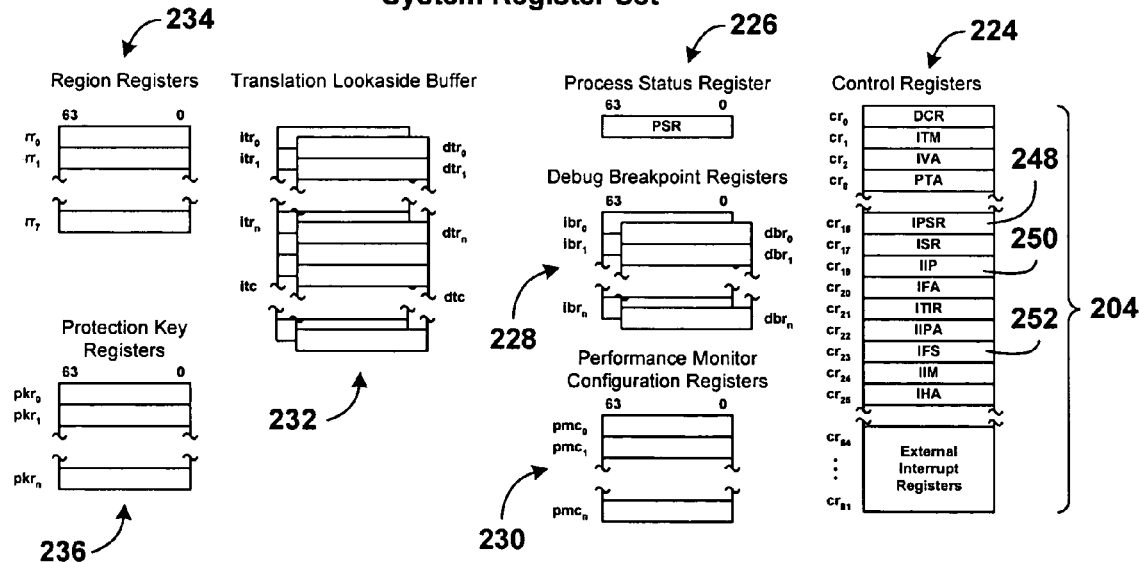

FIG. 2 shows the registers provided in the IA-64 architecture. The registers are partitioned into an application register set 202 and a system register set 204. In general, application registers are accessible at any privilege level, while system registers are accessible only when the processor is currently at privilege level 0, the highest privilege level of the four privilege levels 0, 1, 2, and 3 provided by the IA-64 architecture. In general, privilege level 0 is intended for execution of operating-system kernels, and privilege level 3 is intended for execution of application programs. The registers provided by the IA-64 architecture include a set of 128 64-bit general purpose registers 204, a set of 128 82-bit floating point registers 206, a set of 64 predicate registers 208, a set of 64 branch registers 210, an IP register 212, a current frame marker ("CFM") register 214, and a variety of special purpose registers including application registers ("AR") $AR_0$ through $AR_{127}$ 216, advance load address table registers 218, process-identify registers 220, and performance monitor data registers 222. The system registers, which are accessible only by processes or routines running at privilege level 0, include a set of control registers ("CR") 224, ranging from $CR_0$ to $CR_{81}$, a PSR register 226, break point registers 228, performance monitor configuration registers 230, a translation lookaside buffer 232, region registers 234, and protection key registers 236. Note that particular AR registers and CR registers have acronyms that reflect their use. For example, AR register $AR_{17}$ 238, the backing-store-pointer register, is associated with the acronym BSP, and this register may be alternatively specified as AR[BSP]. In many of the registers, single bits or groups of bits comprise fields containing values with special meanings. For example, the two least significant bits within register AR[RSC] 240 together compose a mode field which controls how aggressively registers are saved and restored by the processor. These two bits can be notationally specified as "AR[RSC].mode."

Each general register in the set of 128 of general registers 204 is associated with a single NaT bit stored in 128 single-bit NaT registers 242. The acronym "NaT" stands for "not a thing," and it is used to facilitate speculative loads, in which the processor loads a register from memory prior to knowing, for sure, whether the execution branch, including the load instruction, will be executed, or loading a value from memory despite a preceding, as-yet-not-executed store instruction, without knowing whether or not the store instruction overwrites the memory value. The bulk of the general registers, $GR_{31}$ through $GR_{127}$, are automatically stored into, and restored from, memory by the IA-64 register stack engine, described below. Another group of general registers, $GR_{16}$ through $GR_{31}$, are banked, so that, on an interruption, the interrupt handler may immediately acquire a different set of general purpose registers $GR_{16}$ through $GR_{31}$, that can be used without overwriting values stored in the normally resident bank of general purpose registers $GR_{16}$ through $GR_{31}$ used by application-level and lower-priority programs. The first 16 general purpose registers $GR_0$ through $GR_{15}$ are neither banked nor automatically stored and restored, and several have special purposes and behaviors.

In the following discussion of the register stack engine and IA-64 architectural support for automated storing of register values into memory and restoring register values from memory, a number of the registers shown in FIG. 2 are described in greater detail. Registers related to this subsequent discussion include: (1) the general purpose registers 204 and accompanying NAT registers 242; (2) the instruction pointer ("IP") 212; (3) the current frame marker ("CFM") 214, which stores information related to the current register stack frame allocated for the currently executing routine; (4) AR[RSC] 240, the register stack configuration register that controls operation of the register stack engine; (5) AR[BSP] 238, the register stack engine ("RSE") backing store pointer; (6) AR[BSPSTORE] 242, the RSE backing store pointer for memory stores; (7) AR[RNAT] 244, the RSE NAT-collection register; (8) AR[PFS] 246, the previous-function-state register that contains, among other things, the value that the CFM register held during execution of the most recently executing, but now stacked, routine; (9) the PSR register 226, the IA-64 process status register; (10) the CR[IPSR] 248, CR[IIP] 250, and additional CR registers involved with storing processor state upon interrupts; (11) the CR[IFS] register 252, the interruption-function-state register; and (12) the performance monitor configuration registers 230 and the performance monitor data registers 222.

Figure 3A:
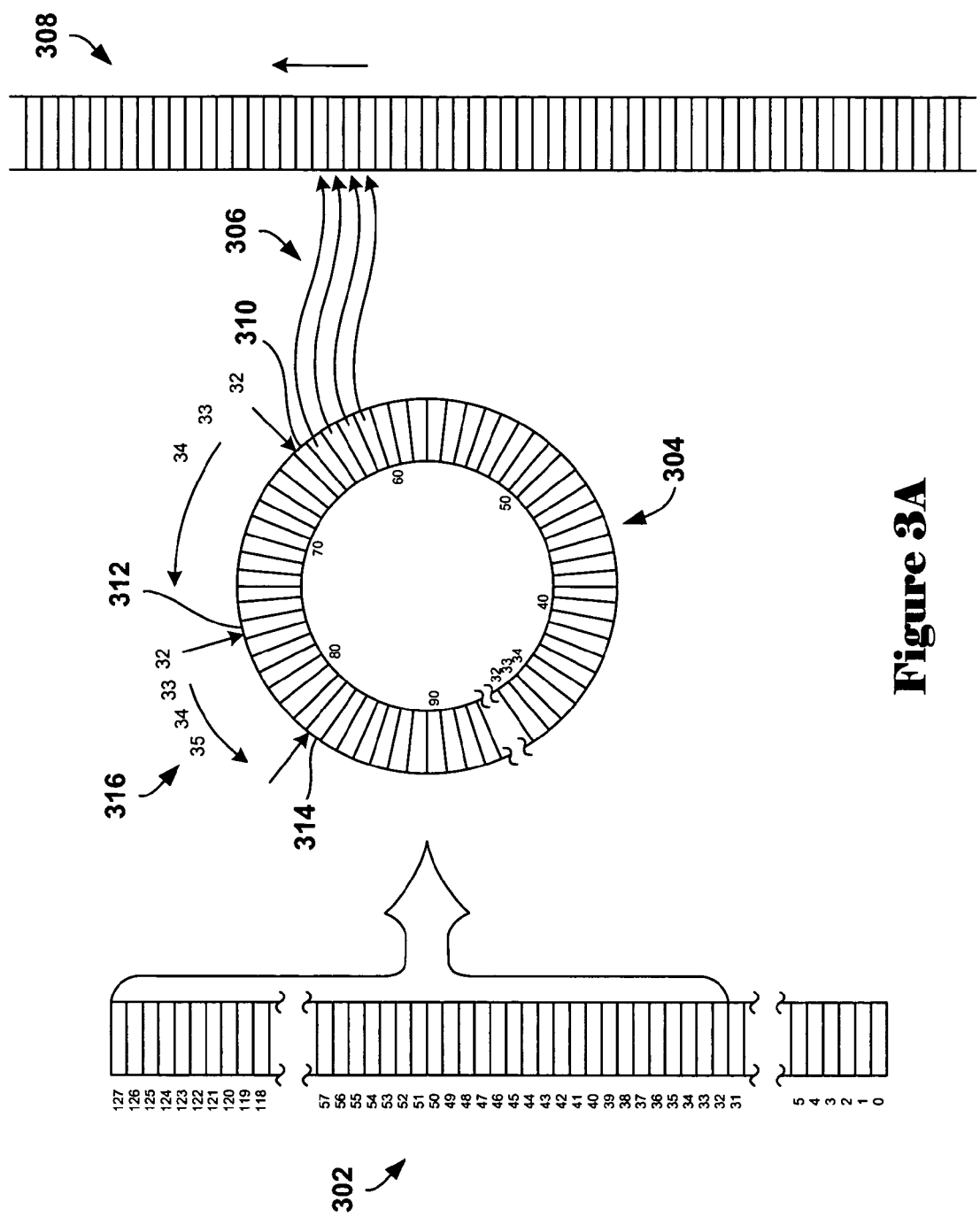
FIGS. 3A–B illustrate the general approach for automated register store and retrieval of register values carried out by the register stack engine ("RSE") provided by the IA-64 architecture.
Figure 3B:
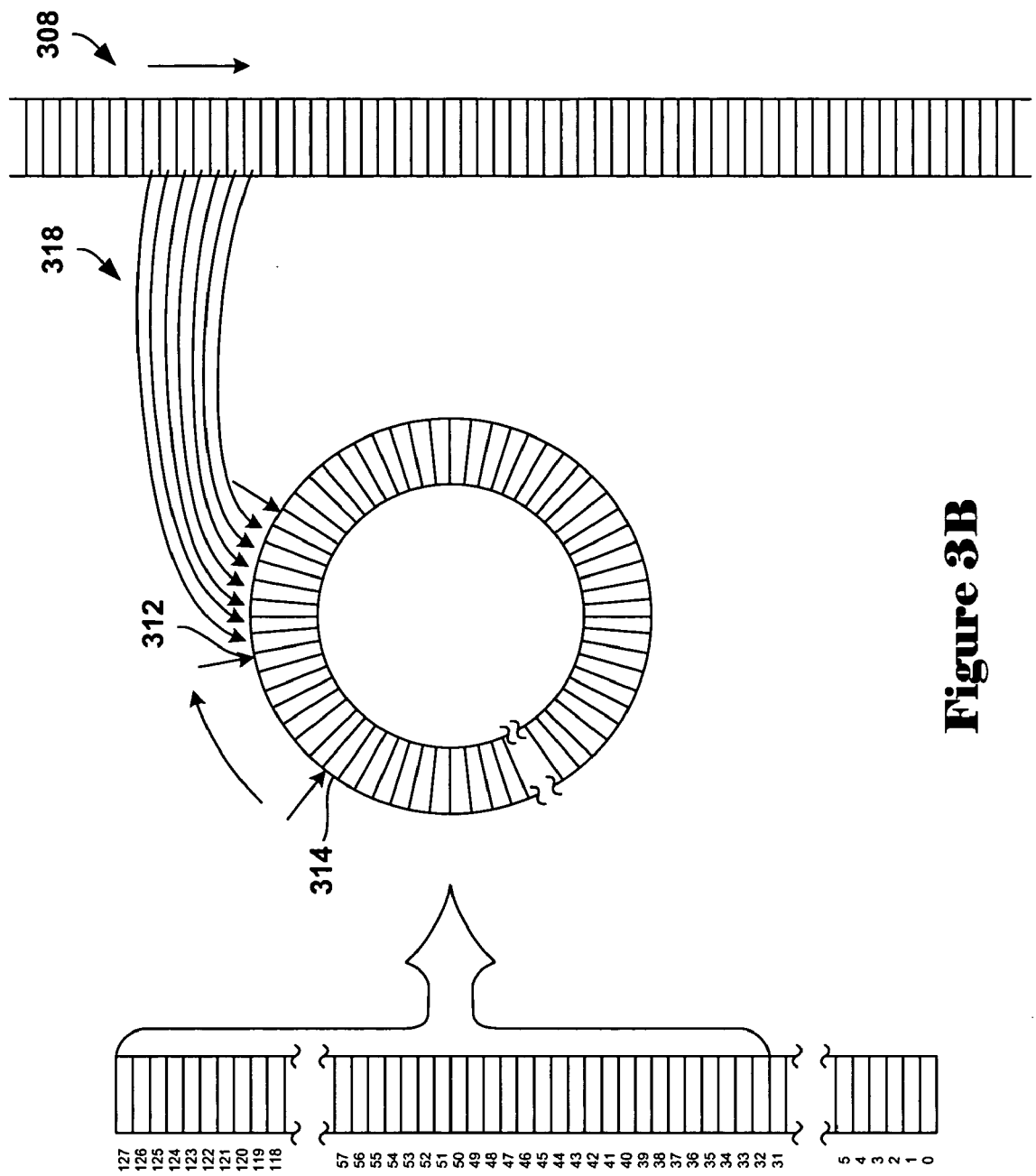

FIGS. 3A–B illustrate the general approach for automated register store and retrieval of register values carried out by the register stack engine ("RSE") provided by the IA-64 architecture. As shown in FIG. 3A, the RSE considers the 96 general purpose registers $GR_{31}$ through $GR_{127}$ 302 to be a circular register buffer 304. The RSE considers this circular register buffer to be essentially infinite, with registers of stacked register-stack frames automatically written 306 to memory 308 by the IA-64 processor, generally using otherwise spare, unused processor cycles essentially asynchronously to routine instruction execution. When a new routine is called, the routine is assigned a new register stack frame. The register stack frame is designated by a pointer into the circular buffer of registers 304. For example, in FIG. 3A, one stack frame begins with register $GR_{65}$ (310), a second stack frame begins with register $GR_{76}$ (312), and the next available stack frame begins with register $GR_{83}$ (314). The currently executing routine is assigned the current stack frame 316 beginning with general purpose register $GR_{76}$. For convenience, the general registers of the current stack frame, registers $GR_{76}$–$GR_{82}$ are renamed to registers $GR_{32}$–$GR_{38}$. The currently executing routine may increase or decrease the size of the current stack frame in order to acquire sufficient general purpose registers needed for computation.

Thus, the currently executing routine, in the example shown in FIG. 3A, may assume availability of general purpose registers $GR_0$–$GR_{38}$, with general purpose registers $GR_{32}$–$GR_{38}$ automatically stored to memory and retrieved from memory as a result of routine calls made by the currently executing routine and called routine completion, respectively.

Thus, to summarize, general purpose registers $GR_0$ through $GR_{15}$ are static, and available for use by all routines and processes. General purpose registers $GR_{16}$ through $GR_{30}$ are essentially static for application routines, but are banked to provide scratch space for interrupt-handling routines. General purpose registers $GR_{32}$ through $GR_{127}$ are considered to be a circular register buffer, as shown in FIG. 3A, on which stack frames are allocated for routines, much like the system stack is directly managed by routines in simpler systems as discussed above with reference to FIGS. 1A–F. The circular buffer of registers is composed of the final 96 general purpose registers, but the registers are renamed for convenience of executing processes so that each executing process uses a set of registers with monotonically increasing numerical names, starting from register $GR_0$ to the highest, renamed general register within the routine's currently allocated stack frame. As shown in FIG. 3A, stack frames are allocated, upon routine calls, in a counter-clockwise direction, or in a direction of increasing numerical register name, but wrap around from general purpose register $GR_{127}$ back to general purpose register $GR_{32}$. The number of stack frames ultimately allocated is bounded only by the size of the backing store 308, since stack frames below the currently allocated stack frame are automatically stored to backing store memory and thus freed to allow for allocation of subsequent stack frames. As shown in FIG. 3B, as the most nested routine completes, and releases its stack frame, the next available stack frame pointer 314 moves in a clockwise direction back to the next most recently allocated stack frame 312, which again becomes the current stack frame. Register values in the now current stack frame, if not already reloaded from the backing store, may be restored 318 from the backing store 308 automatically by the processor.

Figure 4:
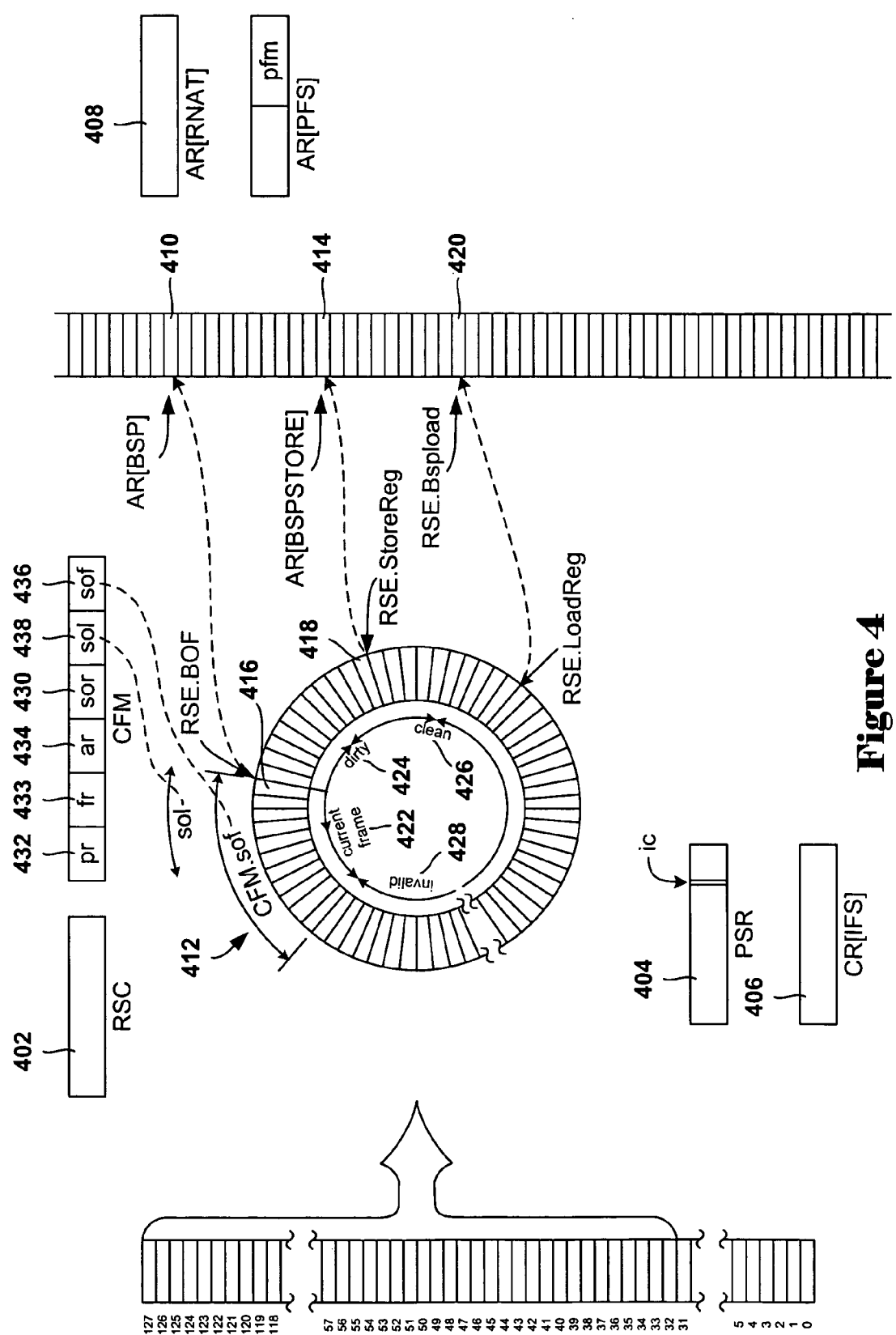
FIG. 4 illustrates control values that control the circular register buffer and the RSE.

FIG. 4 illustrates control values that control the circular register buffer and the RSE. The AR[RSC] register 402 includes fields that specify how aggressively the RSE stores and restores register frames, the privilege level for RSE loads and stores, the endian mode for the RSE, and additional values. The PSR register 404 includes a one-bit field ic that, among other things, determines how portions of processor state are saved, upon an interruption, and how the cover instruction operates. These aspects of the IA-64 architecture are discussed in further detail, below. The PSR register also contains the privilege level at which the processor is currently operating. The CR[IFS] register 406 may receive the value currently stored in the CFM register, upon interruption, and includes a single-bit field v, which indicates whether or not the CR[IFS] register contains a valid, stored CFM value. The AR[RNAT] register 408 accumulates NaT bits associated with general registers stored to backing store and, when filled with NaT bits, is itself written to backing store. Thus, the NaT bits associated with general purpose registers are stored in backing store memory and restored from backing store memory along with the values of the general registers. Every $64^{th}$ 64-bit word value in the backing store contains NaT bits, accumulated in the AR[RNAT] register and written to backing store, associated with the previously stored 63 general registers. The AR[BSP] register contains a memory reference to the next available 64-bit word 410 in the backing store to which the contents of the first word of the current register stack frame 412 may be written following a routine call and allocation of a new, current stack frame. The register AR[BSPSTORE] contains a reference to the 64-bit word in backing store memory 414 to which the RSE will store, or spill, the next dirty register from a nested stack frame.

The IA-64 processor includes various internal registers, not accessible to software routines, which also control RSE operation. These internal registers are notationally referred to by the prefix "RSE" followed by a particular register name. These internal registers include the RSE.BOF internal register, which specifies the general register 416 that represents the first register in the current register stack frame, the RSE.StoreReg internal register that stores an indication of the next general register that needs to be spilled to backing store 418, the RSE.BspLoad internal register, which indicates the next 64-bit word in backing store 420 that needs to be written back to the circular register stack buffer, and the RSE.LoadReg internal register, which stores an indication of the next general purpose register into which the 64-bit memory word referenced by RSE.BspLoad needs to be next loaded.

At any given instant in time, the circular register stack buffer may be considered to comprise four distinct regions. These regions include: (1) the current stack frame 422; (2) a region of dirty registers 424 that contain values from nested stack frames that have not yet been written to backing store; (3) a region of clean registers 426 whose values have been spilled to backing store, but have not been altered since the values were spilled; and (4) a set of invalid registers 428 that do not contain values from nested stack frames and that are immediately available for allocation for expanding the current stack frame or for allocation of new stack frames. The CFM register 430 contains fields that hold values that specify characteristics of the current stack frame. Three of the fields 432–434 contain values that facilitate register renaming. The field sof 436 contains the size, in registers, of the current stack frame. The field sol 438 contains a value indicating the size of the local portion of the current stack frame. The field sor 430 indicates the size of a rotating portion of the stack frame.

FIGS. 5A–G illustrate allocation and de-allocation of a register stack frame associated with a routine call. FIGS. 5A–G, and FIGS. 6A–D that follow, all employ the same illustration conventions. A portion of the circular register buffer 502 is shown in a linear representation, with actual general register names in a column 504 to the left of the portion of the circular register buffer, and the renamed names in a column 506 to the right of the portion of the circular register buffer. In the following, the actual register names are used, although, in practice, only the renamed register names are visible to software. The currently executing routine has been allocated a register stack frame comprising general registers $GR_{77}$ through $GR_{83}$. The currently executing routine has stored two values, symbolically represented in FIG. 5A as "Local 2" and "Local 1" into general registers $GR_{77}$ and $GR_{78}$. The currently executing routine has copied the values stored in the AR[PFS] register 508 into general register $GR_{79}$. The current stack frame size is seven, stored in CFM.sof 510 and the size of the local portion of the current stack frame is five, stored in CFM.sol 512. The registers of the current stack frame not in the local portion of the current stack frame, which comprises general registers $GR_{77}$ through $GR_{81}$, are considered to be the output portion of the current stack frame. The values in these registers are made available to a subsequently called routine, initially comprising the local portion of the stack frame allocated for the called routine. Similarly, the currently executing routine may have received values from the previously executing routine in a lower-end portion of the local part of the current stack frame. Note that routines, as a matter of course, store the contents of the AR[PFS] register 508 into a register within the local portion of the current stack frame so that later, after a series of nested routine calls and completions, the again currently executing routine can restore the value to register AR[PFS] in order to allow for de-allocation of the current stack frame upon completion of the current routine and transfer of control to the previous, most recently nested routine. Note, in FIG. 5A, that the register and memory locations referenced by RSE.BOF and AR[BSP] are indicated. It is assumed that the currently executing routine may be using general registers $GR_{80}$ through $GR_{83}$ for various computation purposes.

Figure 5A:
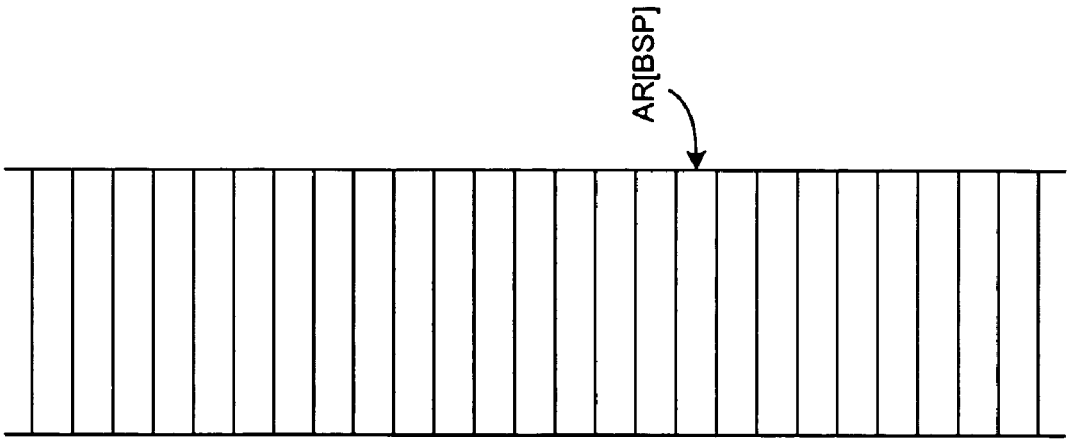
FIGS. 5A–G illustrate allocation and de-allocation of a register stack frame associated with a routine call.
Figure 5A:
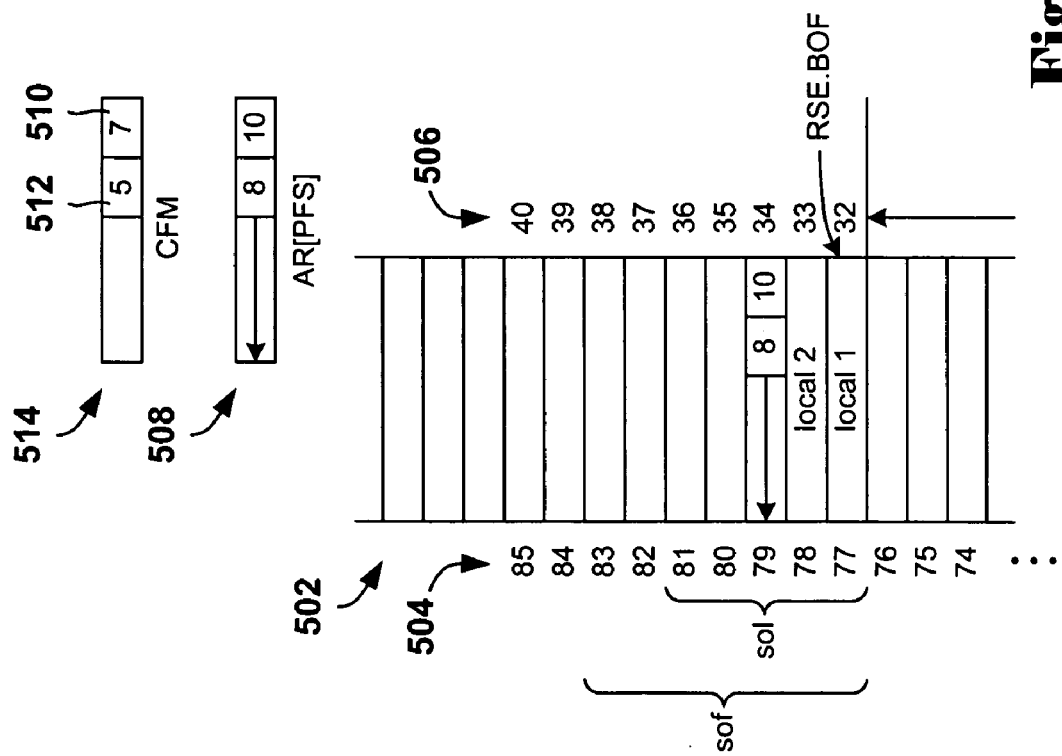
Figure 5B:
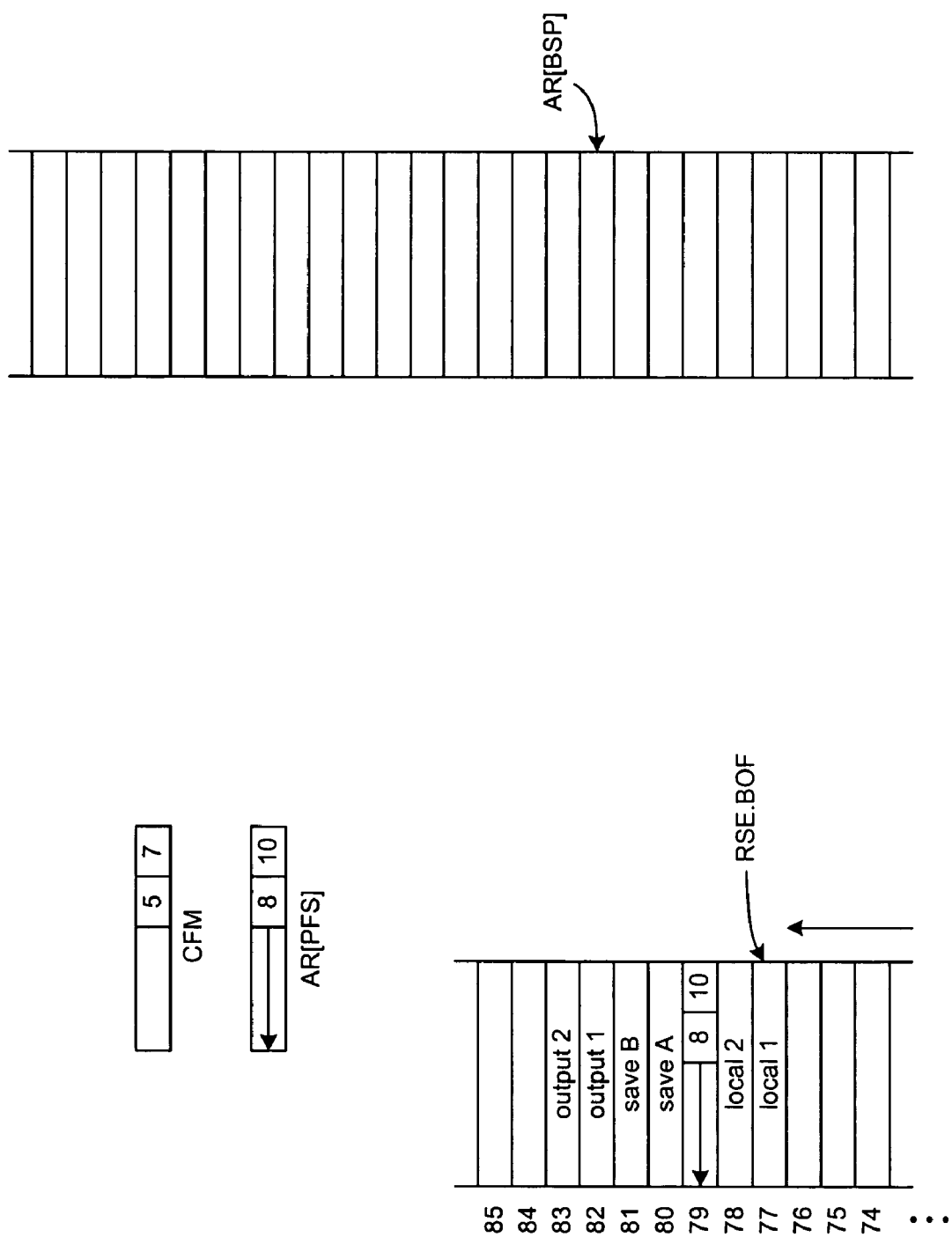

FIG. 5B shows preparations, by the currently executing routine, to call a different routine. As can be seen in FIG. 5B, the currently executing routine has saved two values, symbolically represented in FIG. 5B as "Save A" and "Save B," in general registers $GR_{80}$ and $GR_{81}$, the final two registers in the local portion of the current stack frame, and have placed two output values, symbolically represented in FIG. 5B as "Output 1" and "Output 2" in general registers $GR_{82}$ and $GR_{83}$, the output portion of the current stack frame. An output value in one of registers $GR_{82}$ and $GR_{83}$ includes a pointer to the instruction following the br.call instruction by which the currently executing routine will calls a different routine. This saved instruction pointer is subsequently used to restore the value of the IP register during a transition from the called routine back to the currently executing routine. The stored return IP value and the stored value of register AR[PFS] together provide sufficient information for a subsequent return to the currently executing routine and restoration of the register-based processor state for the currently executing routine, including restoration of the values in the various registers that control RSE operation.

Figure 5C:
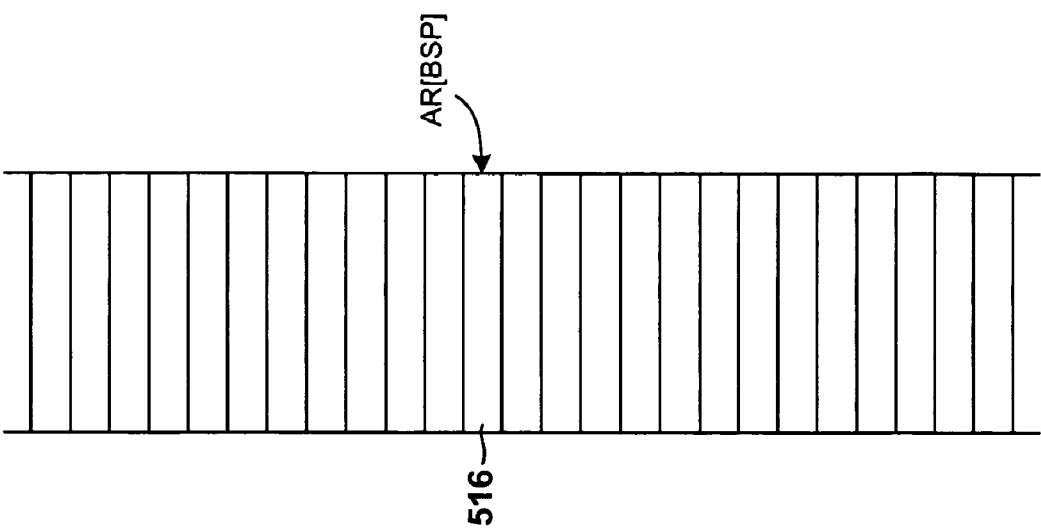
Figure 5C:
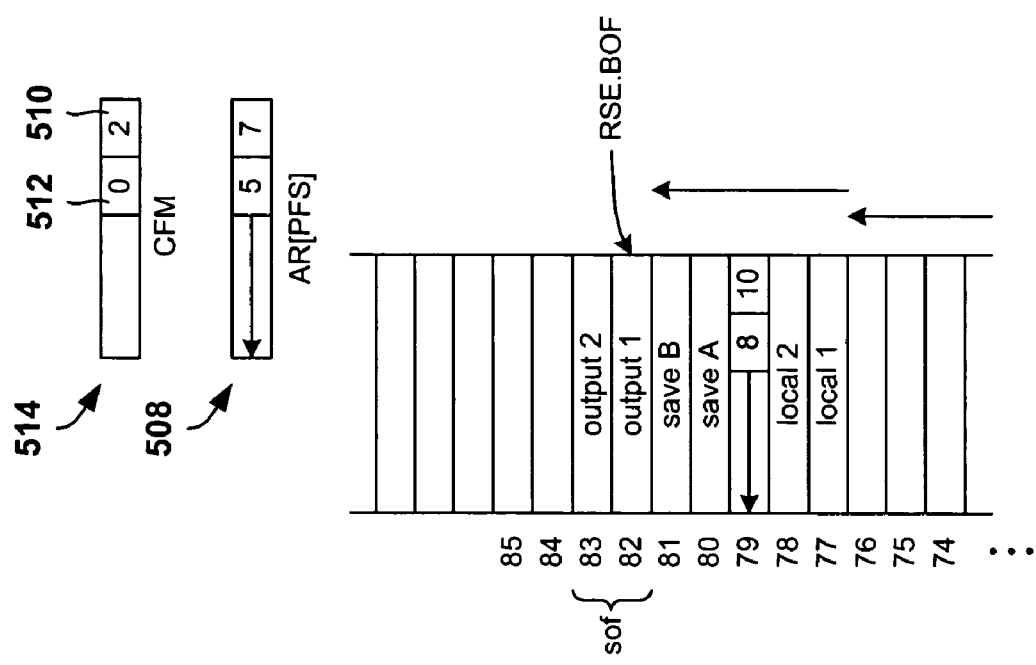
Figure 5D:
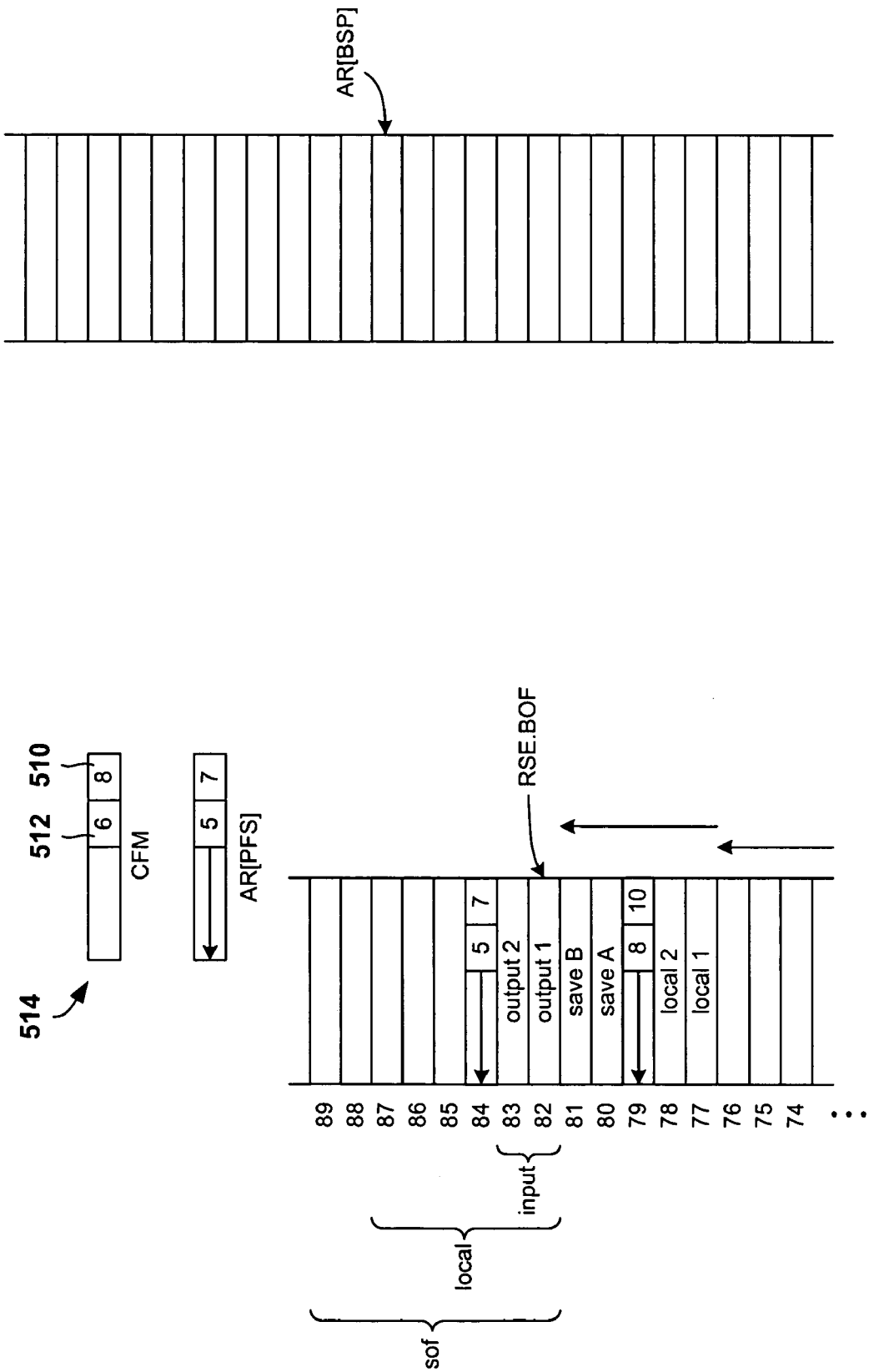

FIG. 5C illustrates a portion of the processor state following execution of the br.call instruction by the previously executing routine associated with the stack frame that begins with general register $GR_{77}$. At the point in time illustrated in FIG. 5C, the called routine has just begun execution. Note that the contents of register AR[BSP] has been adjusted to point to a new location in backing store 526 that represents the next available position for subsequent storing of the new, current stack frame allocated as part of execution of the br.call instruction. Note that the previous value of the CFM register (514 in FIG. 5A) has been moved to the AR[PFS] register 508, and that the CFM 514 contains new values that characterize a newly allocated stack frame currently comprising general registers $GR_{82}$ and $GR_{83}$. Initially, the new, current stack frame consists of the output portion of the previous stack frame, with no registers in the local portion of the newly allocated, current stack frame. Therefore, the CFM contains the value 0 for the sol field 512 and the value 2 for the sof field 510.

The newly executing, called routine generally needs to increase the size of the newly allocated stack frame to provide the called routine with high-speed storage for temporary computed values. Moreover, the called routine needs also to save the contents of the AR[PFS] register in case the called routine in turn calls additional routines, and becomes nested on the register stack below them. In order to increase the current stack frame size, the called routine executes an alloc instruction. The alloc instruction takes arguments that allow the called routine to specify the sizes of the input portion, local portion, and total stack frame desired by the called routine. In the example shown in FIG. 5D, the called routine has specified, via an alloc instruction, a current stack frame comprising a two-register input portion, including general registers $GR_{82}$ and $GR_{83}$, a four-register local portion comprising general registers $GR_{84}$–$GR_{87}$, and a total current stack frame comprising general registers $GR_{82}$–$GR_{89}$. The input portion of the current stack frame indicates the number of registers received by the called routine that were part of the previously executing routine's stack frame, and is included within the local portion of the current stack frame. Note that the sof 510 and sol 512 values of the CFM register 514 have been updated to reflect the new current stack frame.

Figure 5E:
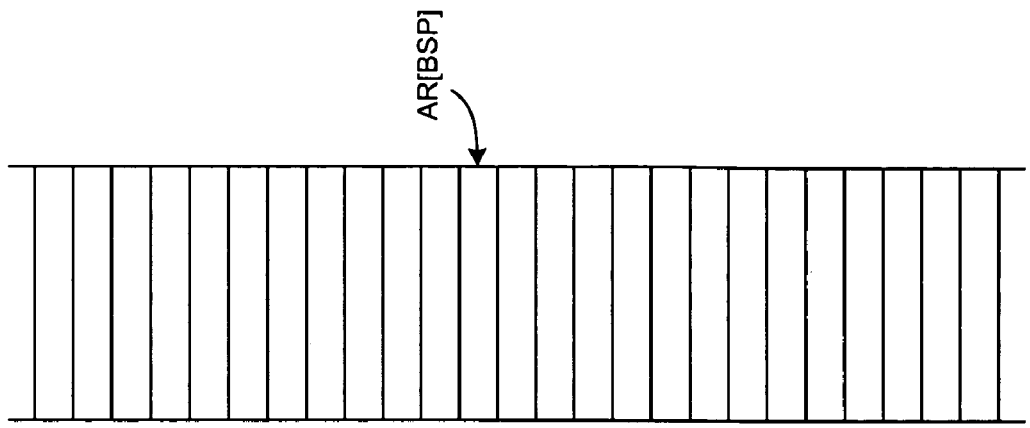
Figure 5E:
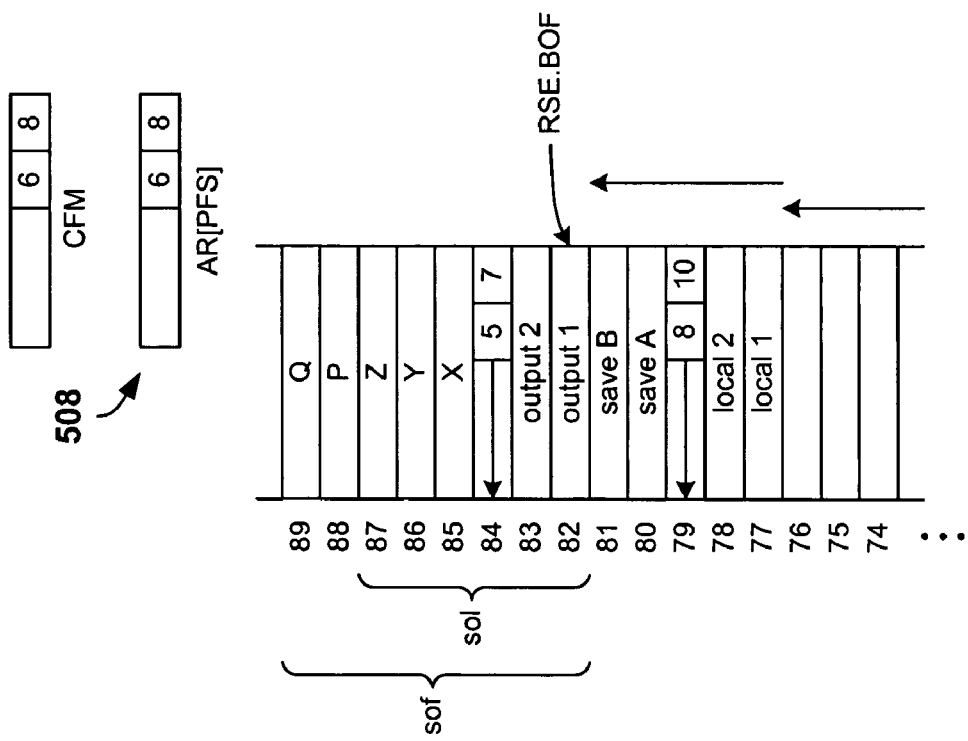
Figure 5F:
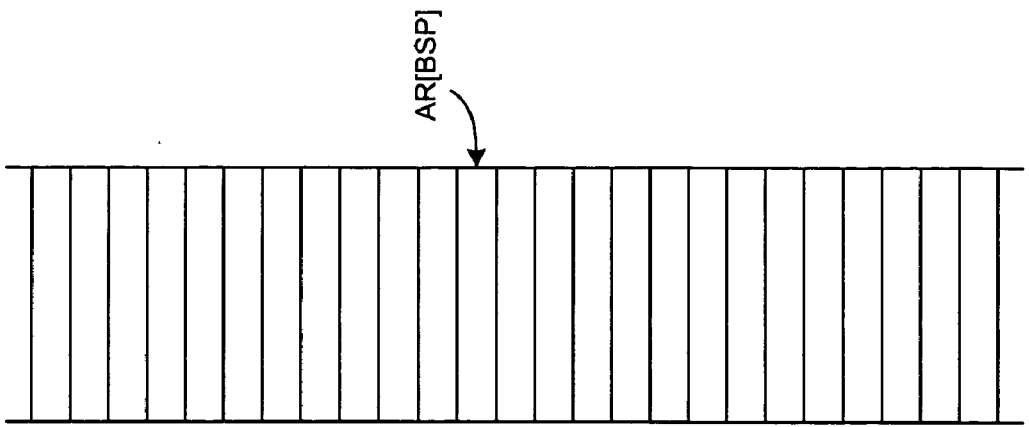
Figure 5F:
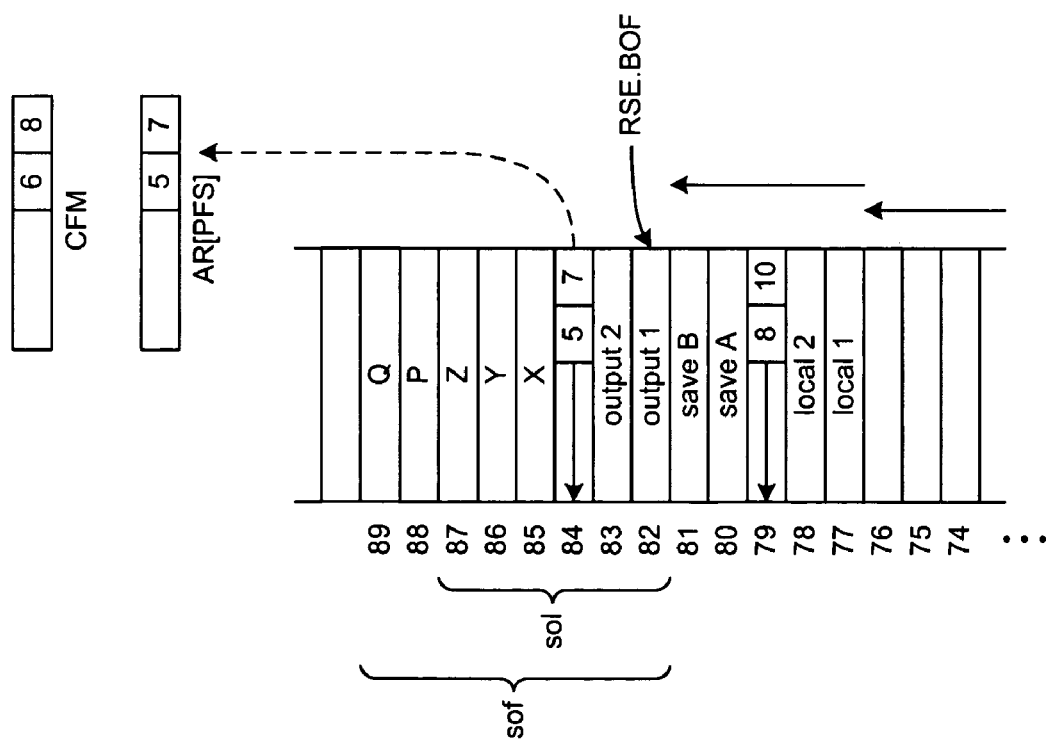
Figure 5G:
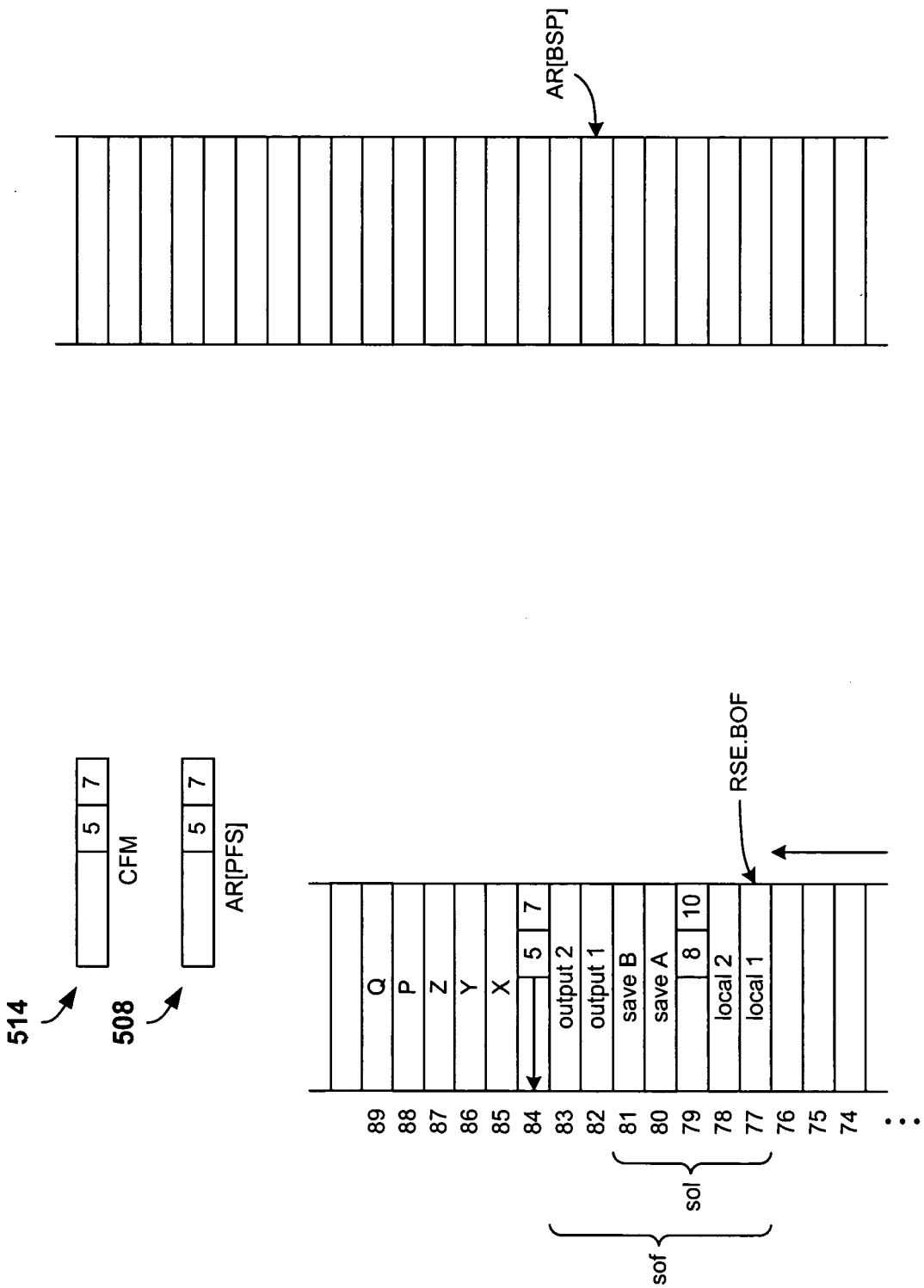

As shown in FIG. 5E, the called routine may carry out various computations, storing temporary values "X," "Y," and "Z," in registers of the current stack frame, and may, in addition, store output values "Q" and "P" in registers in the output portion of the current stack frame for passing to a subsequently called routine. Note that, as shown in FIG. 5E, subsequent routine calls and subsequently called routine terminations may end up altering the contents of the AR[PFS] register 508.

Finally, the called routine terminates. In order to transfer control back to the calling routine, the called routine must first copy the stored contents of the AR[PFS] routine from the called routine's current stack frame to the AR[PFS] register. Next, the called routine executes a br.ret instruction to return control to the calling routine. The called routine uses the IP value stored by the calling routine in an output register of the calling routine, and therefore in a local register of the called routine, in the register stack as a target for the br.ret instruction. Execution of the br.ret instruction results in resetting of the RSE.BOF internal register and the AR[BSP] registers to their previous values, de-allocating the stack frame allocated for the called routine, and restoring the stack frame allocated for the calling routine. The contents of the CFM register 514 have been updated to contain the contents of the AR[PSF] register 508. Thus, the processor state for the calling routine has been restored, including all the values of the stacked registers for the calling routine, referenced by the calling routine as general registers $GR_{32}$ through $GR_{38}$.

Figure 6A:
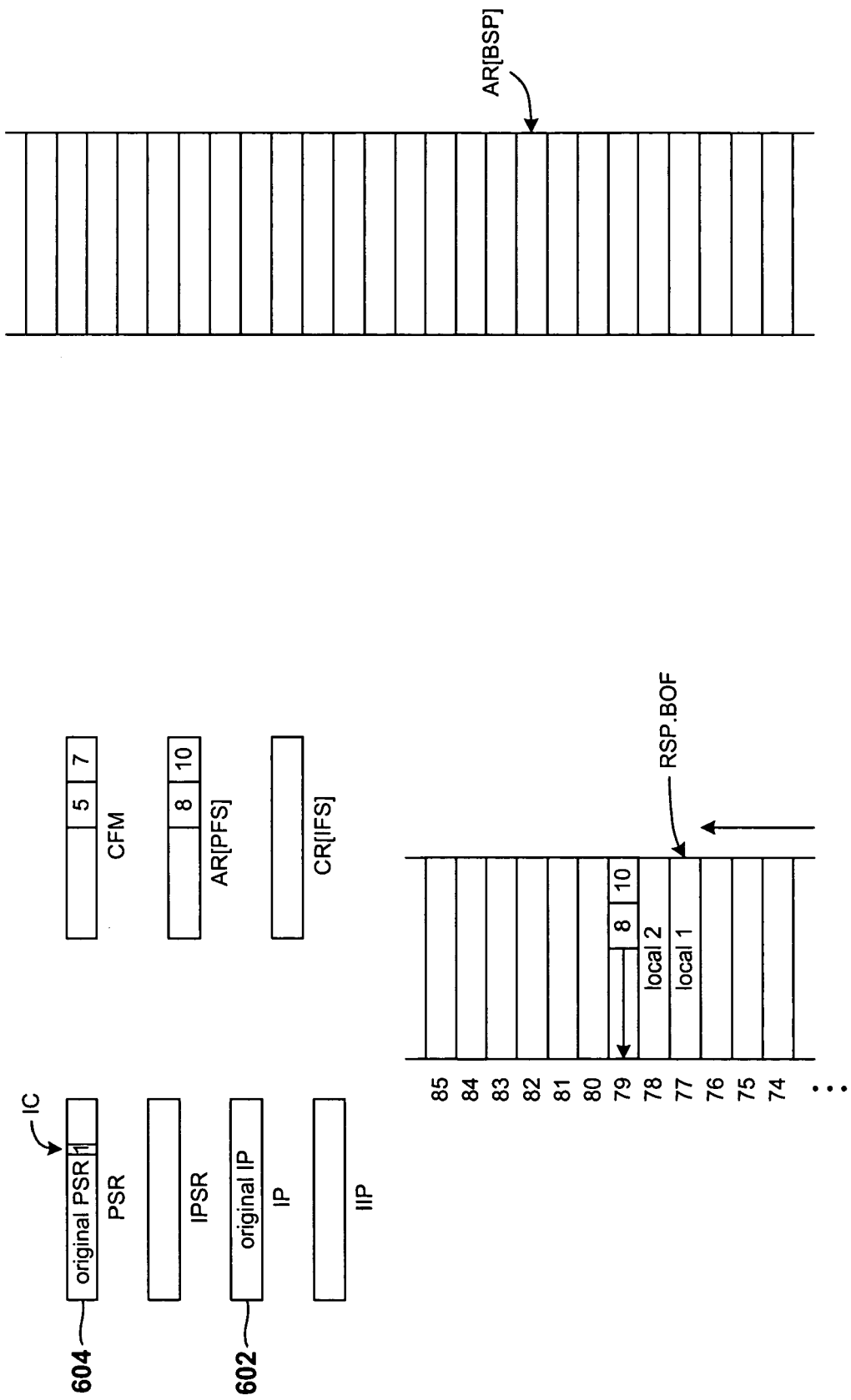
FIGS. 6A–D illustrate RSE operation in relation to interrupt handling by an IA-64 processor.

FIGS. 6A–D illustrate RSE operation in relation to interrupt handling by an IA-64 processor. FIG. 6A shows a portion of the current, register-based processor state of a processor that is currently an executing routine. The portion of the processor state illustrated in FIG. 6A includes values of the IP register 602 and the PSR register 604. In particular, the ic field of the PSR register 604 contains the value "1."

Figure 6B:
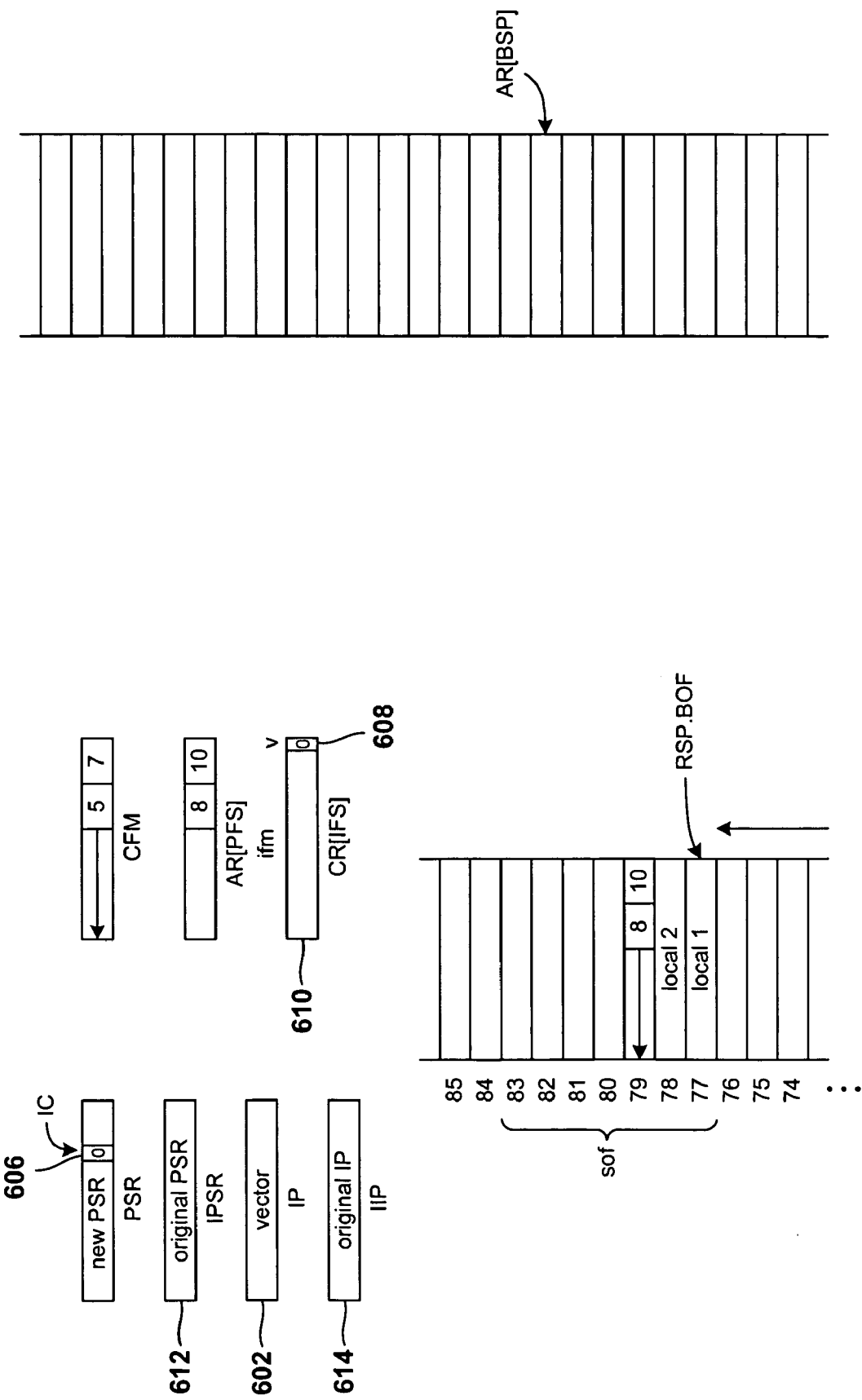

FIG. 6B illustrates a portion of the processor state following an interruption. Initially, the interruption has not altered the RSE-related register and internal register values, but has changed the value of the ic field in the PSR register to "0" 606. Note that the value of the v field 608 of the CR[IFS] register 610 is also 0. Note also that the original contents of the PSR have been copied to the CR[IPSR] register 612 and the original contents of the IP register have been copied to the CR[IIP] register 614. The current contents of the IP register 602 now contain a reference to an interrupt-handling vector. Whether or not the contents of the PSR and IP are copied to the CR[IPSR] and CR[IIP] registers, respectively, is controlled by the value of the ic field of the PSR register. Normally, when non-privileged routines are executing, the ic field of the PSR register has a value "1." This value indicates that the contents of the IP and PSR registers should be copied to the CR[IIP] and CR[IPSR] registers, respectively, upon interruption. Moreover, upon interruption, the ic field of the PSR register is cleared. Clearing of the ic field essentially turns off processor-state storage in the case that a subsequent interruption occurs. If a subsequent interruption occurred, the CR[IPSR]

and CR[IIP] registers would again be overwritten, removing information needed to return to the initially interrupted application routine.

Figure 6C:
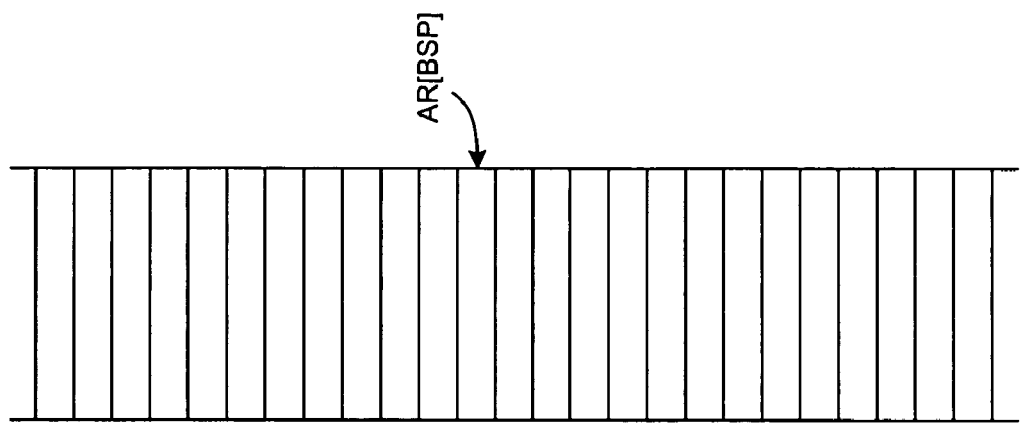
Figure 6C:
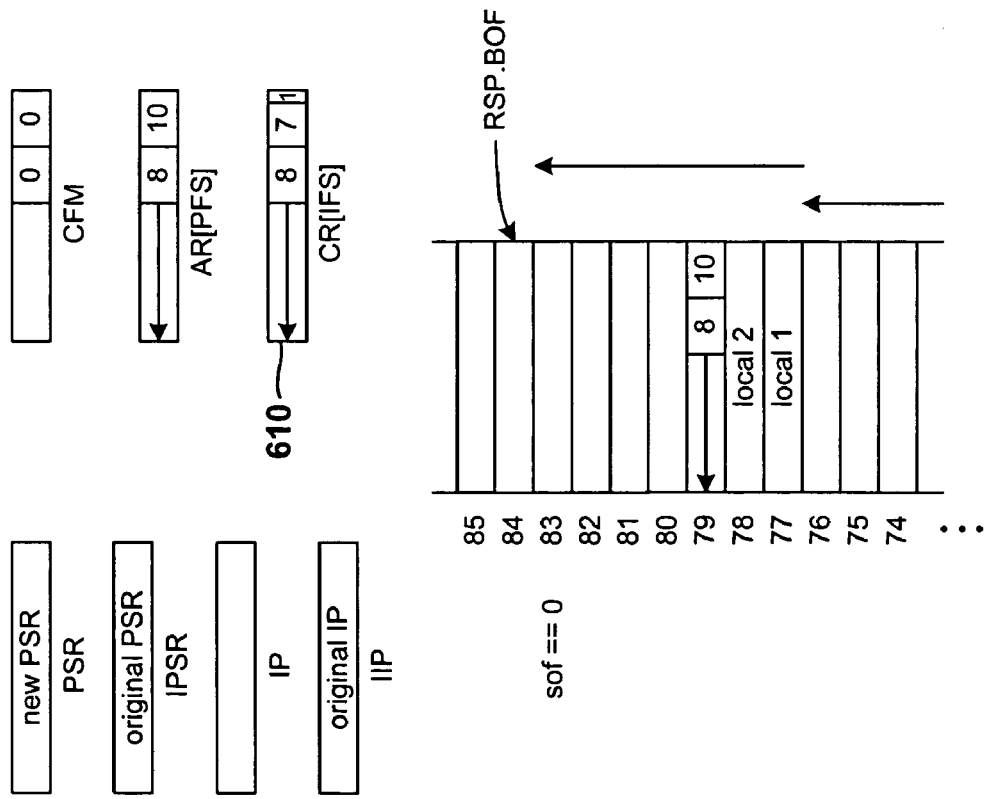
Figure 6D:
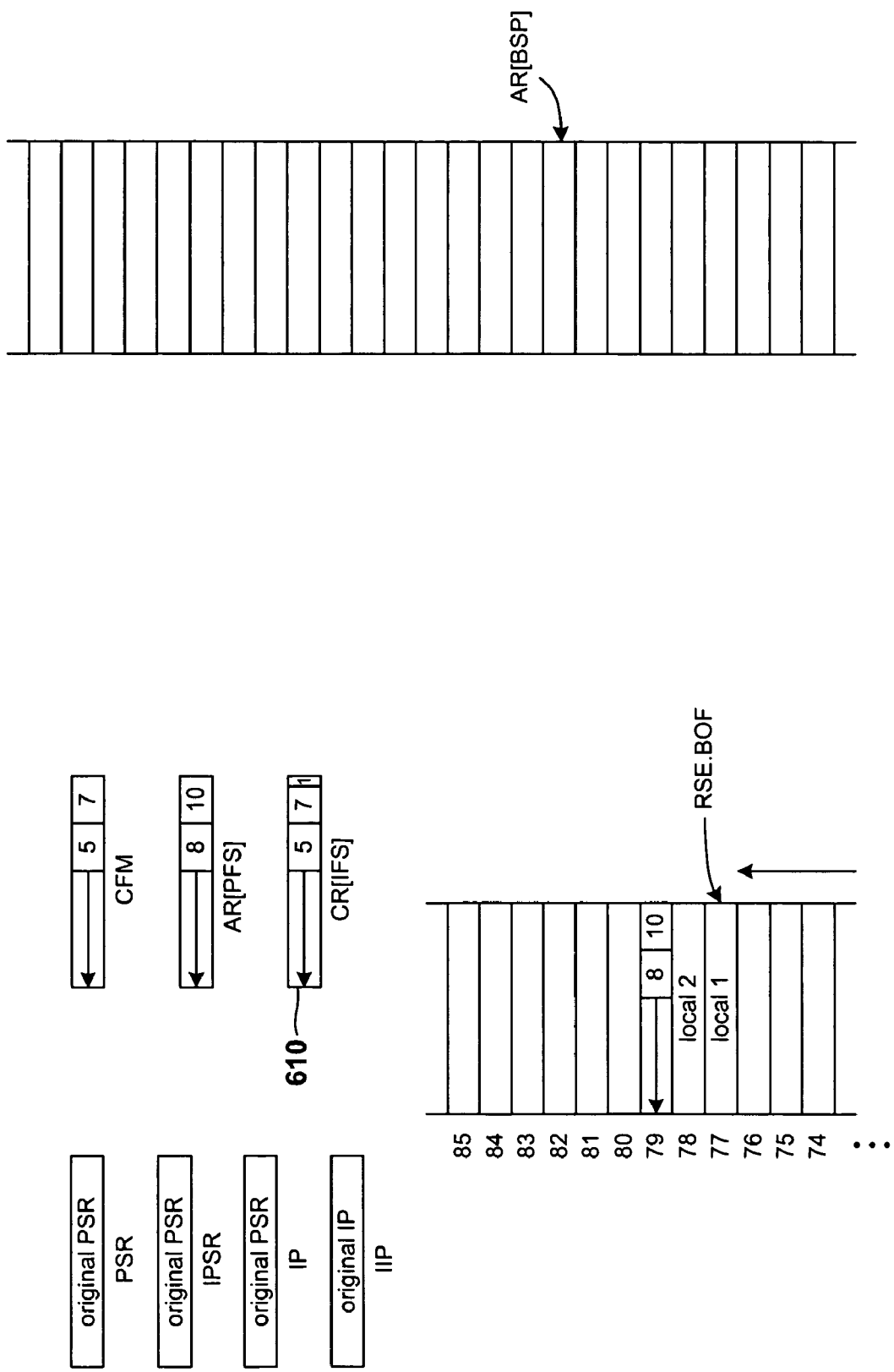

The RSE-controlling internal registers and application registers are not updated to provide a pathway for extremely efficient interruption handling for interrupt handlers that can handle an interrupt using the first 16 general purpose registers and the banked register set $GR_{16}$ through $GR_{30}$. This fast-path mechanism decreases the overhead associated with interrupt handling. However, in the case that the interrupt handler needs additional general-register resources, the IA-64 architecture provides a mechanism for those resources to be obtained. The interrupt handler may issue a cover instruction which has the effect of allocating a new, current register stack frame of size 0 and thus moving the stacked registers allocated for the interrupted routine from the current stack frame to the dirty-register region. FIG. 6C illustrates a portion of the processor state following execution of a cover instruction by the interrupt handler. When the PSR.ic field has a value "0," as it does following an interruption, the cover instruction also copies the contents of the CFM register to the ifm field of the CR[IFS] register 610. The v field of the CR[IFS] register 610 is set to "1," to indicate that the CR[IFS] register contains a valid copy of the CFM. The CFM is then updated to reflect the newly allocated stack frame of size 0. The interrupt handler can then allocate additional general register resources in order to carry out interrupt handling. Finally, the interrupt handler finishes, and executes an rfi instruction to return control back to the interrupted routine. In executing the rfi instruction, the processor notes that the v field of the CR[IFS] register 610 has the value "1," and copies the contents of the CR[IFS] .ifm field into the CFM. Following execution of the rfi instruction, the original processor state of the interrupted routine is restored. Note that, when the PSR.ic field has a value "1," the cover instruction does not store the current contents of the CFM into CR[IFS].ifm, and does not set the field CR[IFS].v to 1. The cover instruction is not privileged, and can be executed by an application routine in order to allocate a new, zero-length current stack frame. However, because only a privileged routine can set PSR.ic to "0," only a privileged routine, including an interrupt handler, can obtain the full benefit of the cover instruction, namely storing of the contents of the CFM register into CR[IFS] .ifm.

The IA-64 architecture provides two additional instructions relevant to RSE operation. The flushrs instruction directs an IA-64 processor to flush all dirty registers to backing store, and the loadrs instruction directs the IA-64 processor to reload register values stored in backing store to general-purpose registers.

Embodiments of the Present Invention

The cover instruction is, as described above, useful for register-stack management by privileged code, including interruption handlers. The cover instruction is particularly useful for facilitating efficient context switching by operating systems. Normal operating systems time multiplex processor resources by running each of many concurrently executing processes for relatively short time intervals, interrupting a currently executing process in order to context switch to another concurrently executing process, later resuming execution of the interrupted process for a subsequent time interval. The cover instruction facilitates restoration of the register stack for resumed processes.

Figure 7:
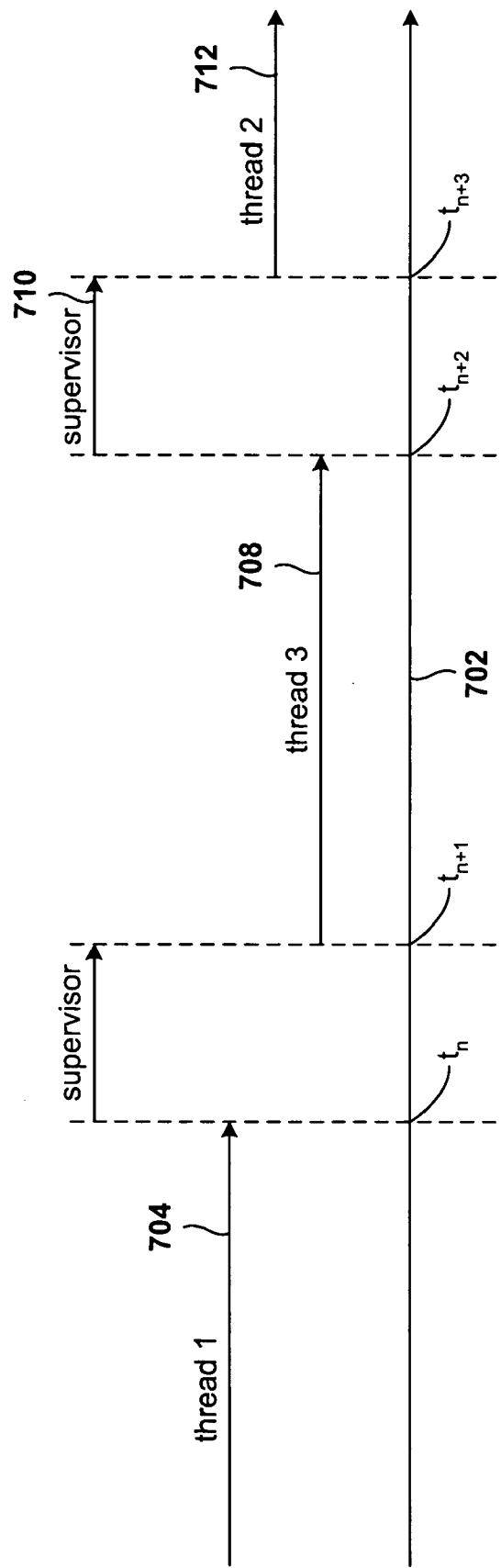
FIG. 7 illustrates a short period of time, or instruction-execution progress, during operation of a multi-threaded application process.

A similar context-switching method is often desirable for multi-threaded applications that manage multiple, concurrently executing threads at privilege levels below the most privileged level. FIG. 7 illustrates a short period of time, or instruction-execution progress, during operation of a multi-threaded application process. In FIG. 7, time or instruction-execution progress is represented by a horizontal, directed time line 702. In the short interval of time illustrated in FIG. 7, a first thread executes 704 up to time $t_n$, at which point it is interrupted, and a supervisor resumes execution to switch thread contexts from thread 1 to thread 3. Once the supervisor carries out the context switch, thread 3 resumes execution at time $t_{n+1}$. Thread 3 executes 708 up until time $t_{n+2}$, at which point thread 3 is interrupted and the supervisor is again resumed 710 in order to carry out a subsequent thread context switch. Following completion of the subsequent context switch, at time $t_{n+3}$, a different thread, thread 2, begins executing 712.

In order to accomplish context switching, the supervisor needs to manage the register stack so that the register-based processor state for an interrupted thread is stored in memory, and the register-based processor state for a resumed thread is restored from memory. Moreover, the resumed thread needs to find itself with a current stack frame identical to the stack frame that existed when the resumed thread was last interrupted. The cover instruction is an IA-64-architecture-provided vehicle for efficiently reinitializing the stack during a context switch. It is a feature used by operating systems to provided operating-system-managed process context switching to enable execution of many concurrent processes within a computer system. However, operating systems generally run at privilege level 0, and obtain the full benefit of the cover instruction when the PSR.ic field is set to "0," as described above. By contract, processors executing at less than the most privileged level 0 cannot directly obtain the direct benefit of the cover instruction. It was long thought that the full benefits of the cover instruction are simply not available to non-privileged processes. However, embodiments of the present invention, including a disclosed embodiment discussed below with reference to FIGS. 8A–K, provide a way for non-privileged code to efficiently use the cover instruction to obtain the full benefits obtained by privileged code from the cover instruction.

FIGS. 8A–K illustrate one embodiment of the present invention in the context of a multi-threaded application program, a brief portion of execution of which is illustrated in FIG. 7. FIGS. 8A–K all employ the same illustration conventions which are, in the interest of brevity, described once with reference to FIG. 8A. In order to manage multiple, concurrently executing threads, the supervisor employs separate backing-store memory for each thread. Thus, in FIG. 8A, a portion of the backing-store memory for thread 1 802 and the backing-store memory for thread 2 804 is shown. In addition, the supervisor maintains, in memory, certain basic context information for each thread in thread-context blocks, such as thread-context block 806 for thread 1, in memory. The current contents of the CFM register and the AR[PFS] register 810 are also partially illustrated. Finally, a portion of the circular register buffer is shown in linear form 812.

Figure 8A:
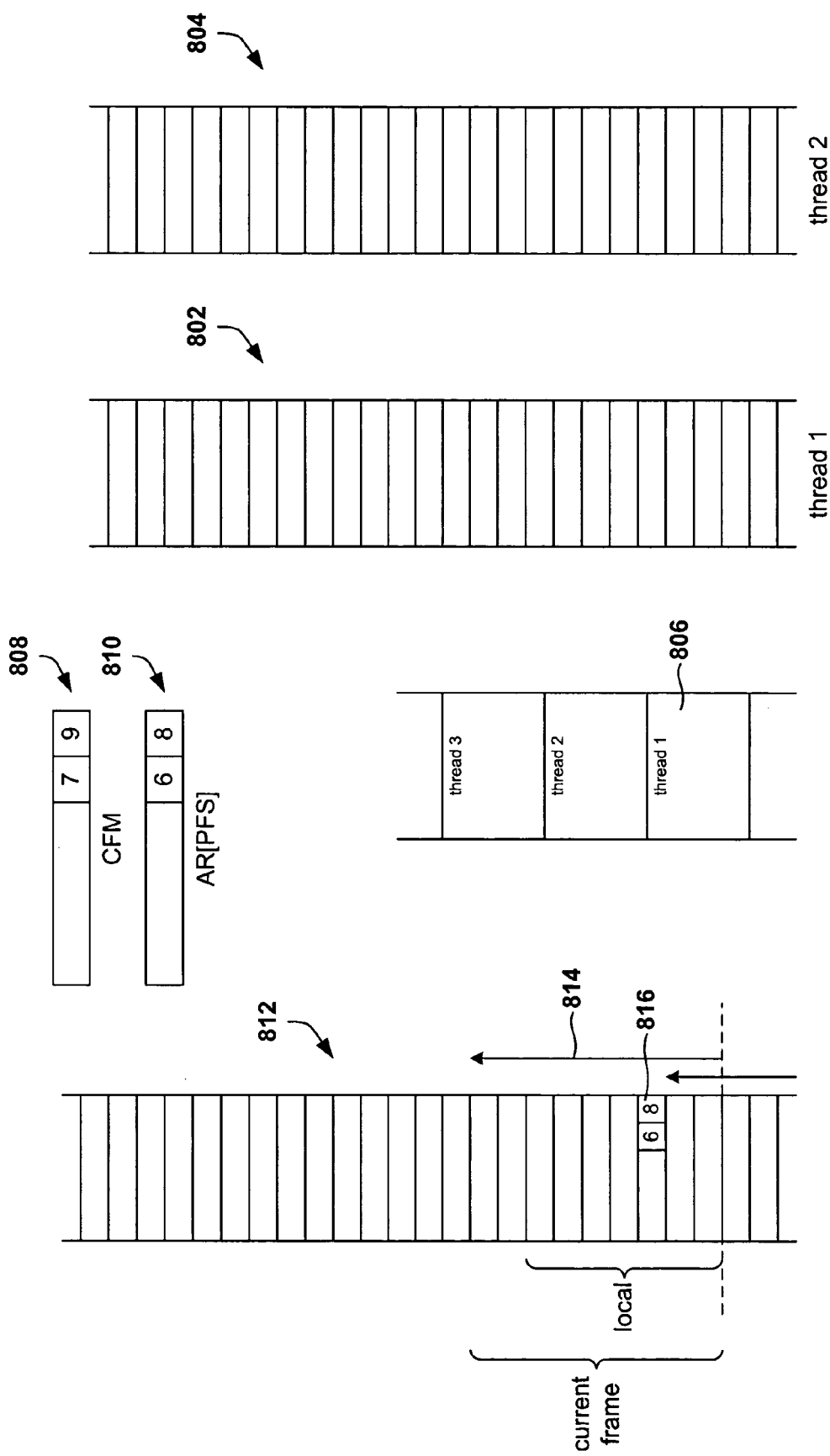
FIGS. 8A–K illustrate one embodiment of the present invention in the context of a multi-threaded application program, a brief portion of execution of which is illustrated in FIG. 7.

In FIG. 8A, thread 1 is executing, with a current register stack frame including nine registers 814 of which seven registers compose the local portion. Thread 1 has saved the contents of the AR[PFS] register into local register $GR_{34}$ 816. At the point in time shown in FIG. 8A, an interruption has occurred, and control has been transferred to the supervisor, which executes in the same context as thread 1 was executing prior to the interruption. At this point in time, the supervisor decides to switch contexts in order to run thread 2. In doing so, the supervisor issues a cover instruction.

Figure 8B:
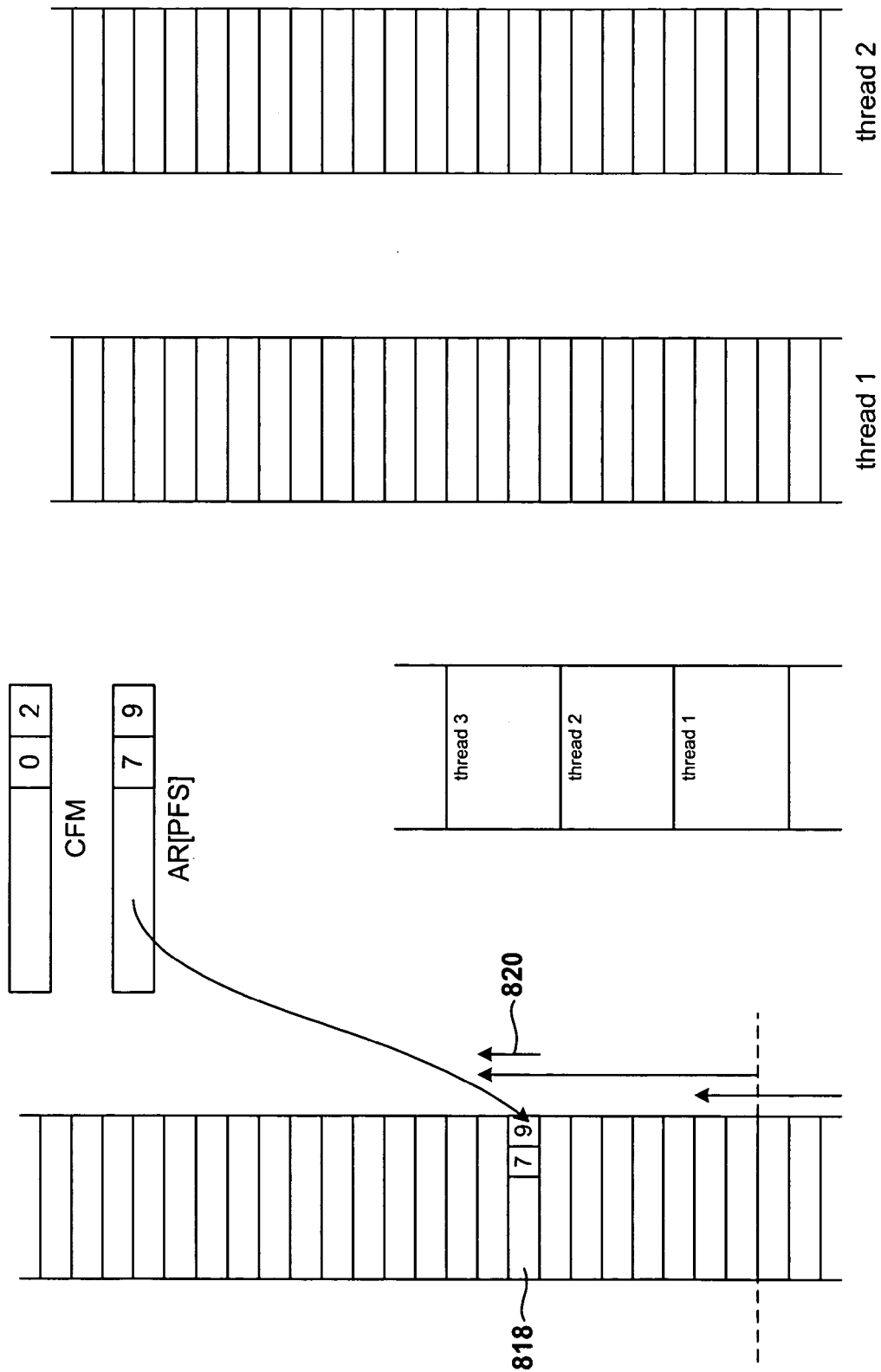
Figure 8C:
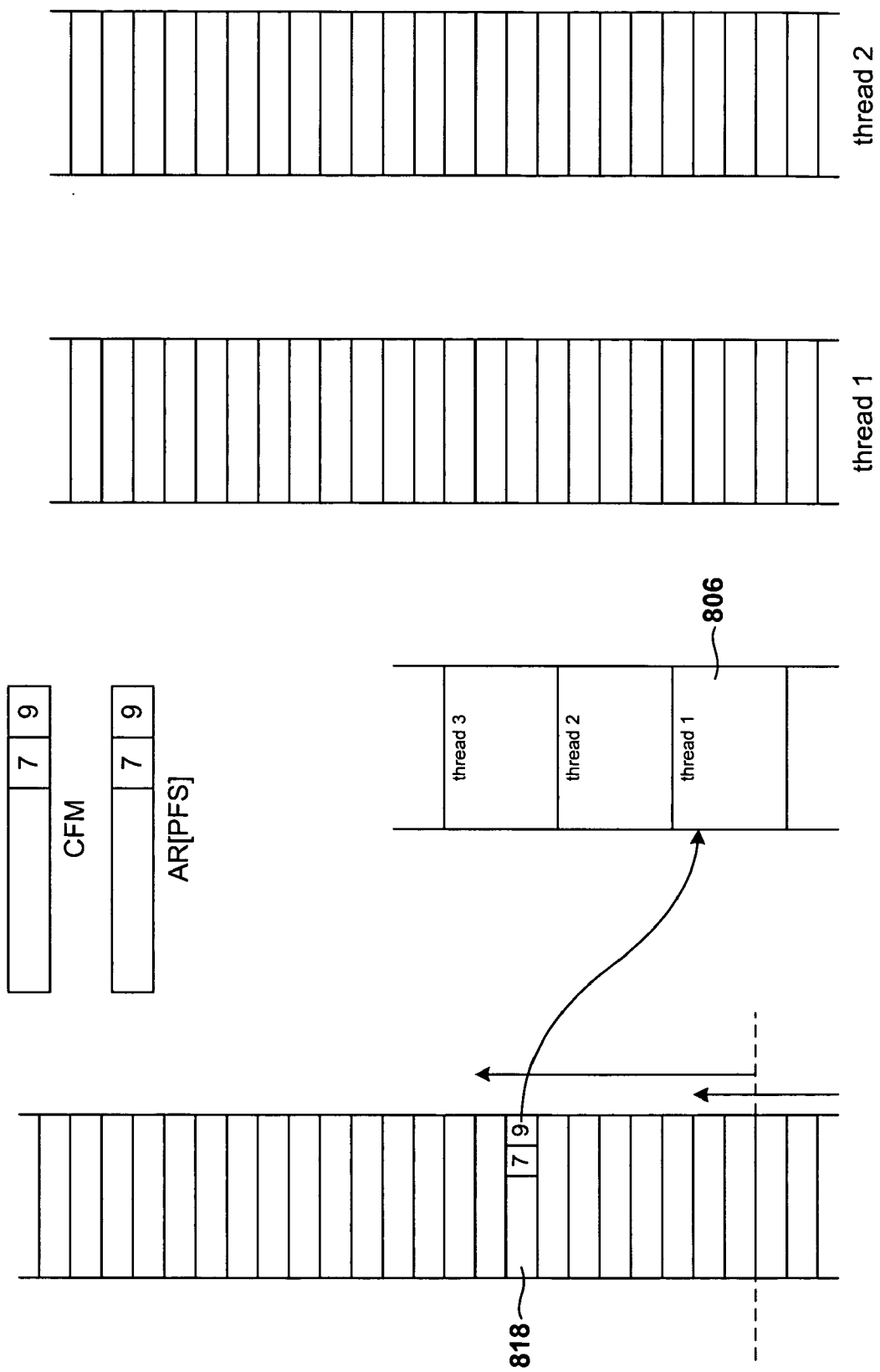

In the first step, shown in FIG. 8B, the supervisor calls a tiny routine, the sole function of which is to move the contents of the AR[PFS] register into the first local register 818 of the stack frame automatically allocated for the routine 820. When the routine returns, as shown in FIG. 8C, the contents of the AR[PFS] register returned by the routine to the supervisor in the supervisor's first output register 818 are moved by the supervisor into the thread-context block 806 for thread 1. Thus, by calling the routine, the supervisor has managed to obtain the current contents of the CFM register for storing in the thread-context block 806. This routine-call mechanism for obtaining the contents of the CFM register is needed, because the CFM register is neither readable nor writeable by processors running at any privilege level.

With the current contents of the CFM register safely stored in memory, the supervisor then issues a cover instruction which allocates a new, empty stack frame 822, adjusting the contents of the AR[BSP] register 824 and relegating all of the registers of the previous stack frame 826 to dirty-register status. The supervisor then calls a flushrs instruction to store the registers of the current stack frame, as well as any as-yet unstored registers of previous stack frames, to the backing-store memory 802 for thread 1. Following execution of the cover instruction, the supervisor stores the current contents of the AR[BSP] register into the thread-context block 806 for thread 1.

Figure 8D:
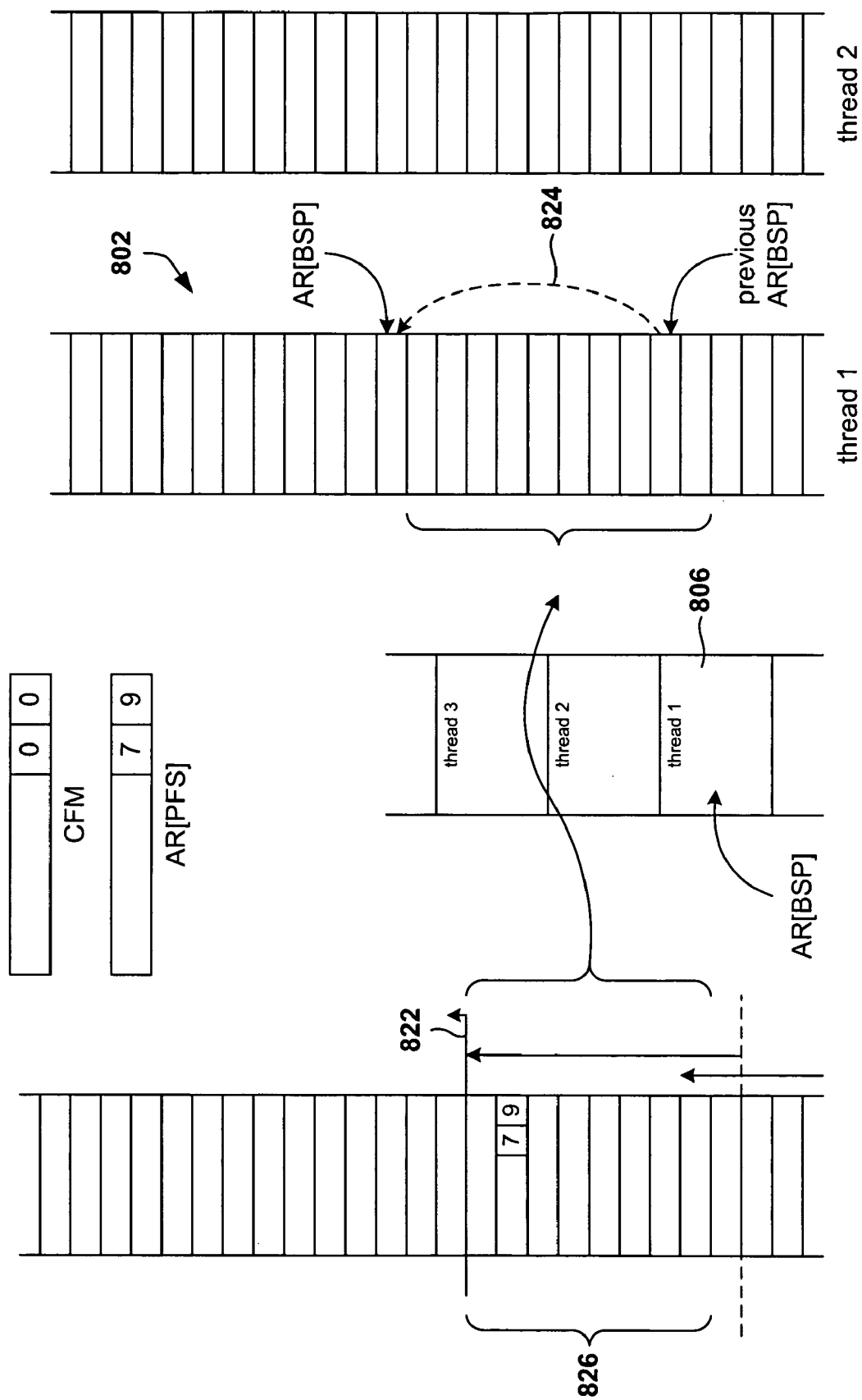

Following the operations illustrated in FIG. 8D, the supervisor may now restore the state of another thread, which can then resume executing to complete the context switch. The next executing thread may call subsequent routines and carry out other operations and activities using a restored register-based processor context, completely oblivious to the state of the register stack prior to the context switch. Additional interrupts, interruptions, and context switches may subsequently occur, and many additional register stack frames may be allocated and deallocated. Finally, an interruption occurs that returns control to the supervisor, which determines that it is time to resume thread 1.

Figure 8E:
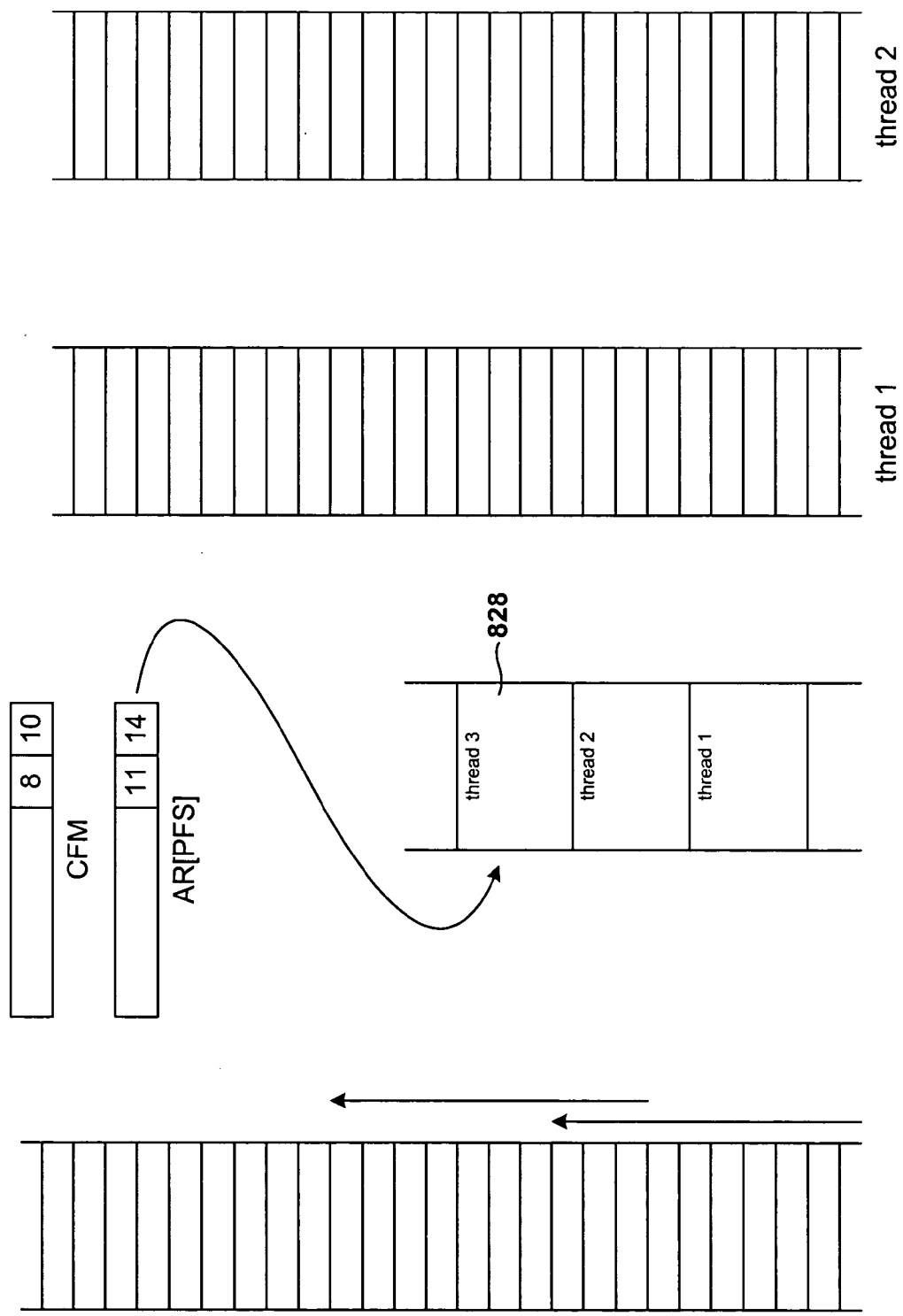
Figure 8F:
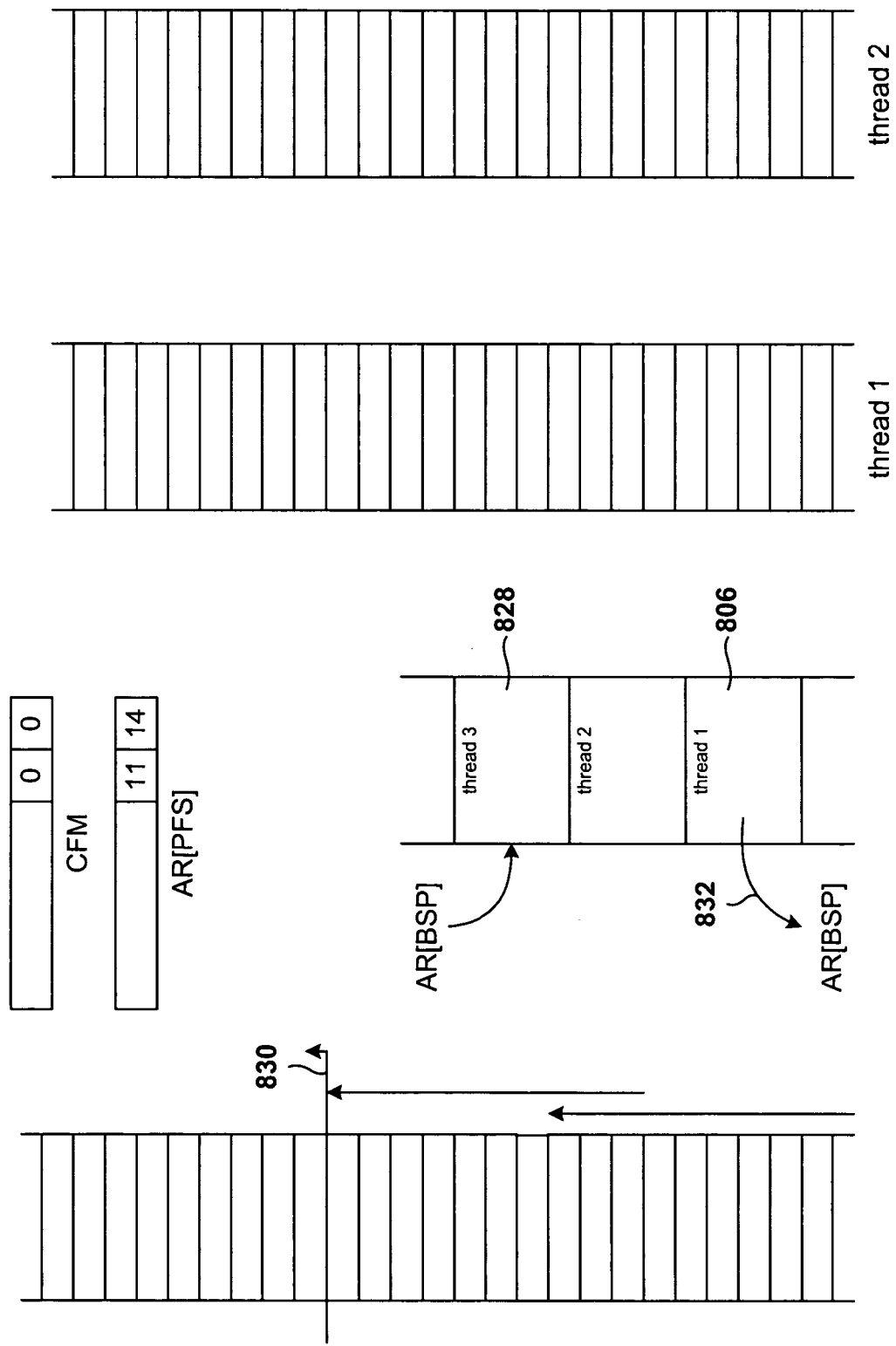
Figure 8G:
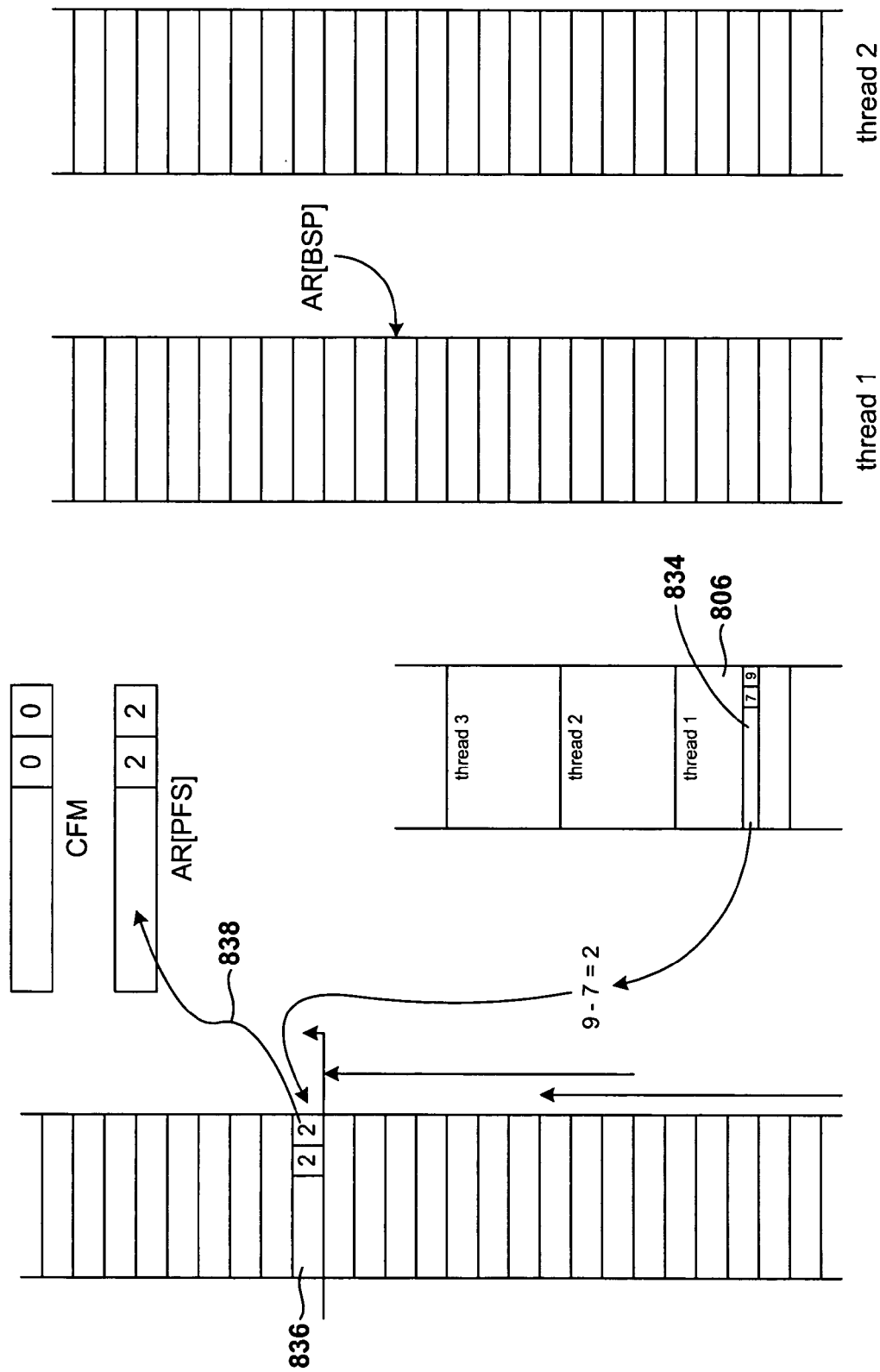
Figure 8H:
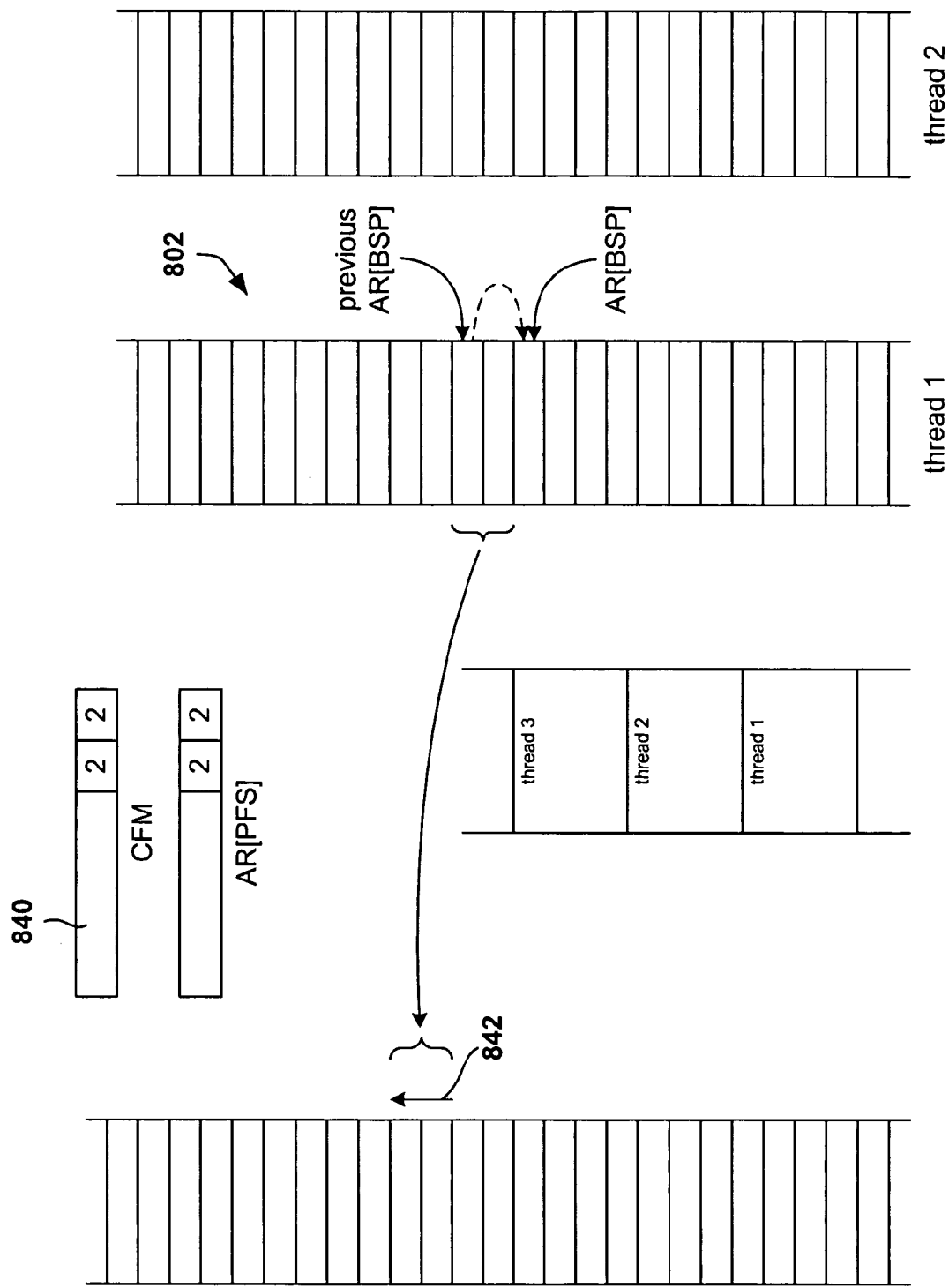

FIG. 8E illustrates the register-based processor state as the supervisor endeavors to resume execution of thread 1. First, the supervisor saves the current contents of the AR[PFS] register into the thread-context block 828 for the interrupted thread using the routine-call method illustrated in FIGS. 8B–C. Then, as shown in FIG. 8F, the supervisor issues a cover instruction to allocate a new stack frame 830 and stores the resulting value found in the AR[BSP] register into the thread context block 828 of the interrupted thread. Then, the supervisor retrieves the stored value for the AR[BSP] register from the thread-context block 806 for thread 1 and moves the stored value back into the AR[BSP] register 832.

In a next step, the supervisor computes the number of output registers in the stack frame that was associated with thread 1 when thread 1 was last interrupted by accessing the stored contents of the CFM register 834 within the thread-context block 806 for thread 1. The sol field value is subtracted from the sof field value to produce the number of output registers, in the example shown in FIG. 8G, the number "2." The supervisor constructs an AR[PFS] value 836 with sof and sol fields both equal to the number of output registers in the stack frame that was the current stack frame when thread 1 was interrupted, and moves that AR[PFS] value into the AR[PFS] register 838. The supervisor then executes a br.ret instruction that copies the constructed AR[PFS] value from the AR[PFS] register into the CFM register 840, changes the contents of the AR[BSP] register to reflect de-allocation of a stack frame of length "2," resulting in a new current stack frame 842 of length "2." The contents for the stored registers of this new stack frame are then reloaded from the backing-store memory 802 for thread 1 by the RSE.

Figure 8I:
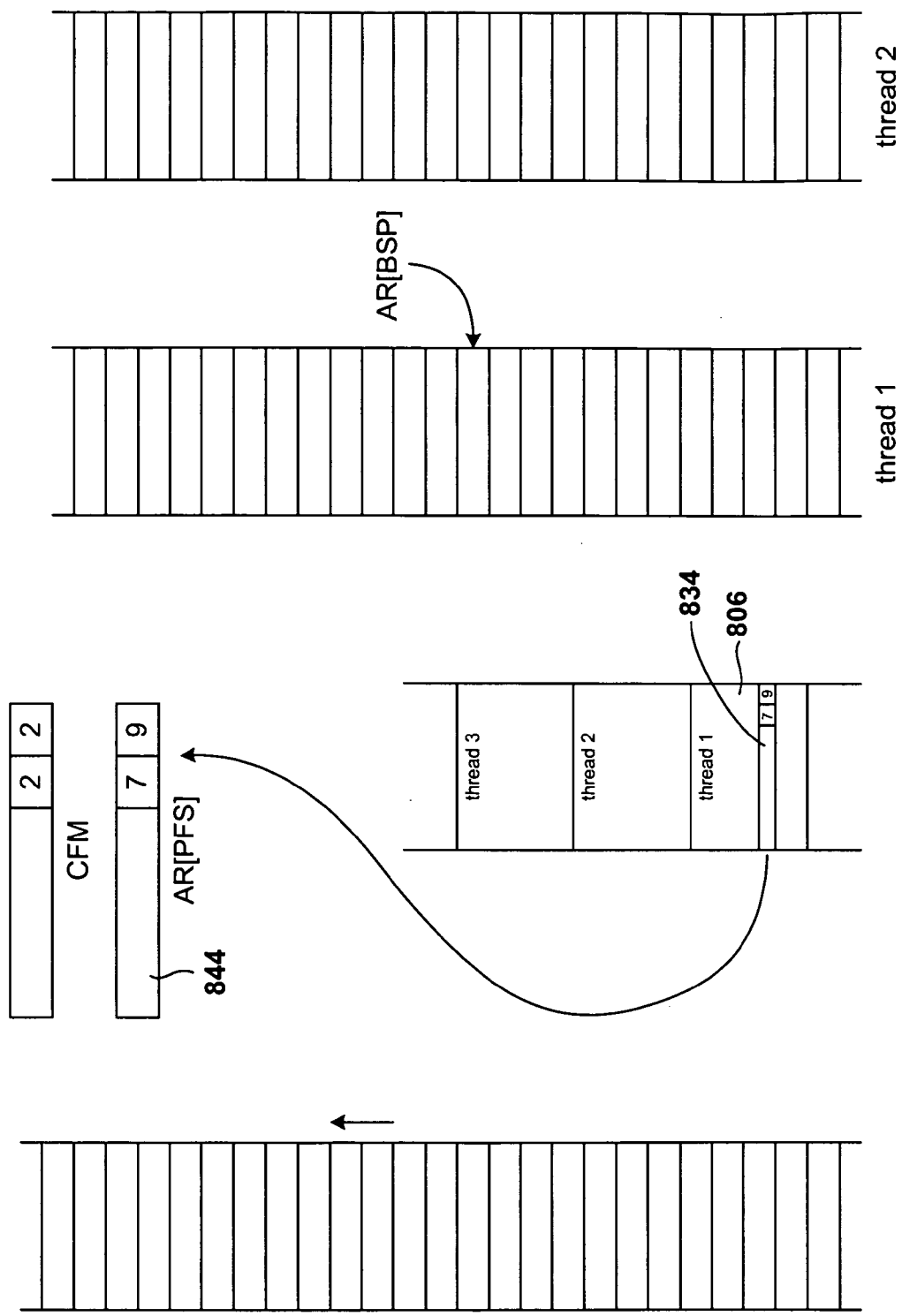
Figure 8J:
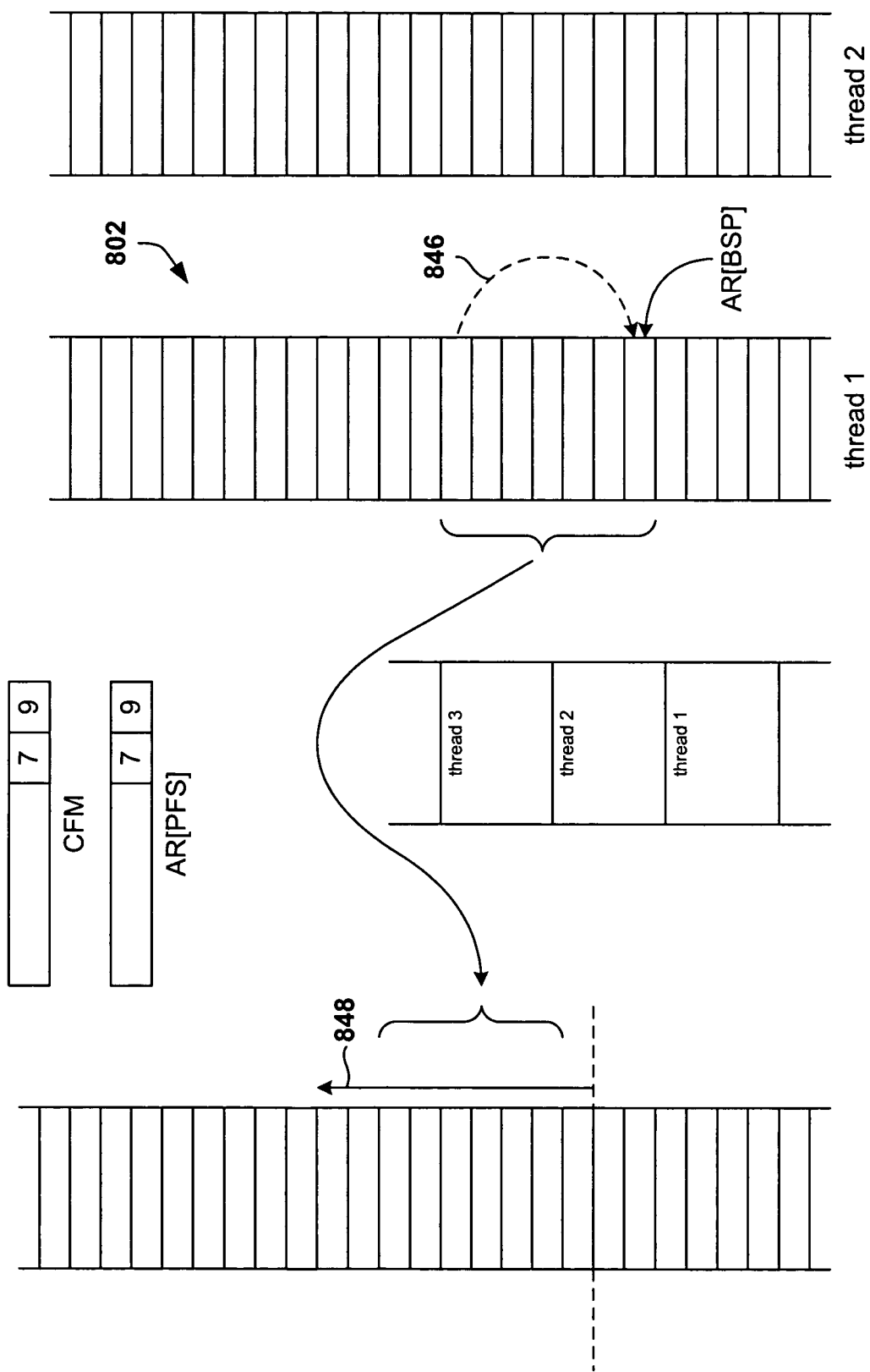
Figure 8K:
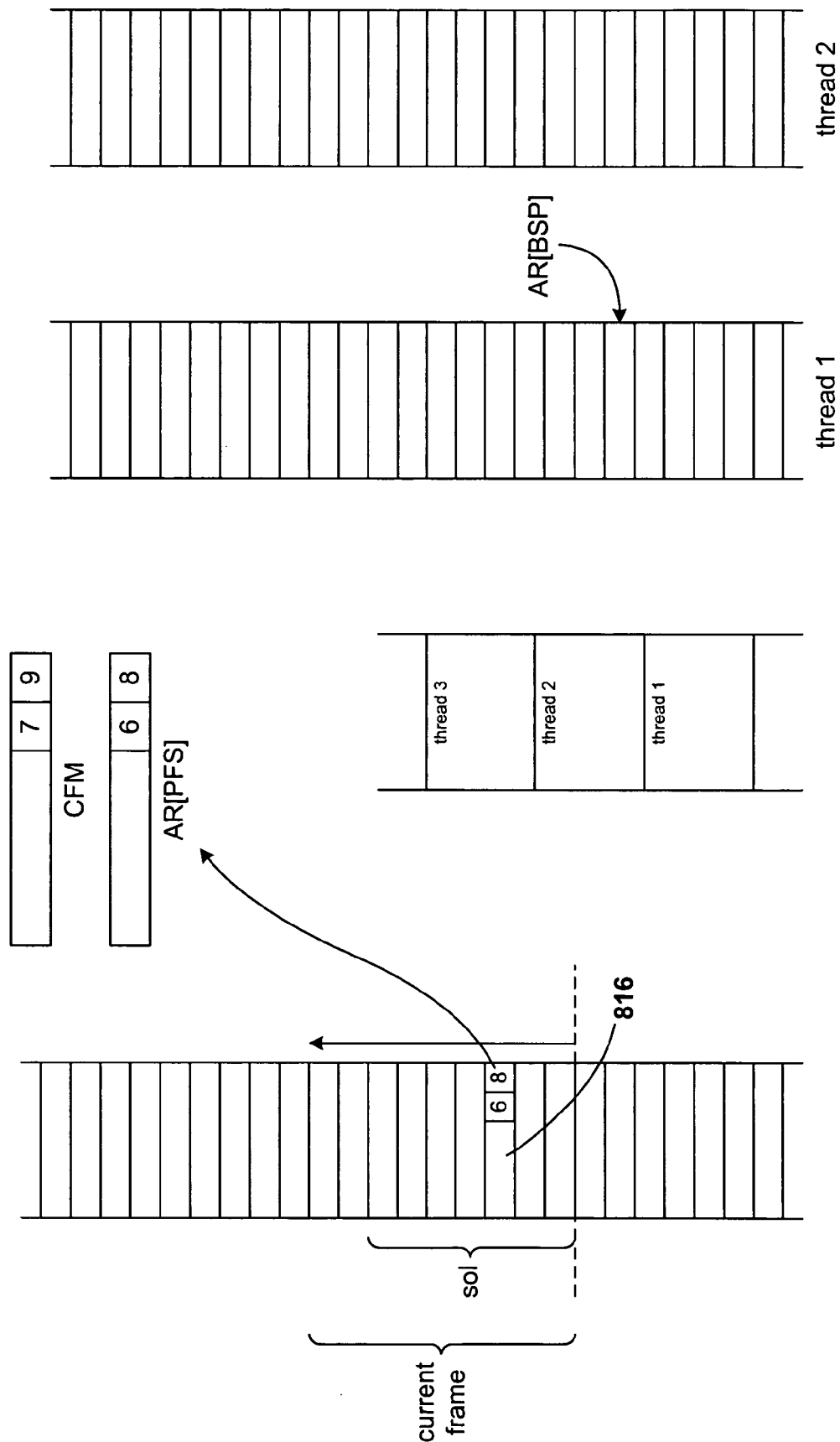

Next, as shown in FIG. 8I, the supervisor loads the stored AR[PFS] value 834 from the thread-context block 806 associated with thread 1 into the AR[PFS] register 844. Next, as shown in FIG. 8J, the supervisor executes a br.ret instruction, which restores the state of the register stack to that at the time when thread 1 was interrupted. The register-stack and register-based processor states are restored for thread 1 because the contents of AR[BSP] are decremented by the number of local registers in the stack frame existing at the time thread 1 was interrupted 846 and the previously current register stack frame is de-allocated to restore a stack frame of length 9 848 with seven local registers and two output registers, as specified by the contents of register AR[PFS]. The contents of register AR[PFS] are moved into the CFM register. The br.ret instruction also results in the registers of the new, current stack frame 848 being reloaded from backing-store memory associated with thread 1 802 by the RSE. Finally, as shown in FIG. 8K, the previous contents of AR[PFS] register can be restored from a local register 816 of the current stack frame.

Figure 9:
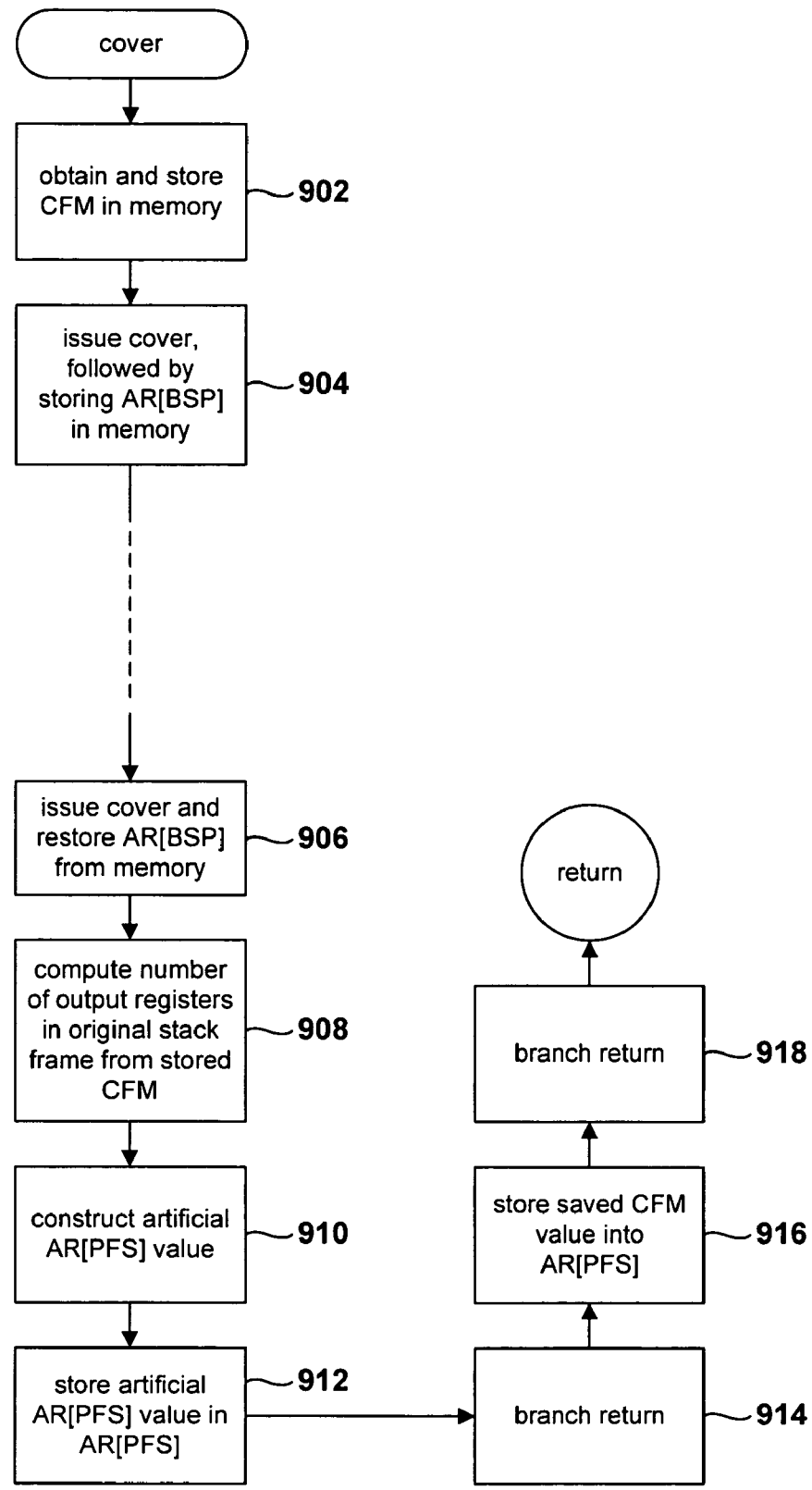
FIG. 9 is a control-flow diagram that summarizes the described embodiment of the present invention.

FIG. 9 is a control-flow diagram that summarizes the described embodiment of the present invention. In step 902, the current contents of the CFM register are obtained and stored in memory, in one embodiment using the routine call method illustrated in FIGS. 8B–C. Next, in step 904, a cover instruction is issued, and the resulting contents of the AR[BSP] register is also stored in memory. At some subsequent point, when it is desired to return to the register-stack and processor states that existed when the cover instruction was issued, in step 904, a second cover instruction is executed in step 906, followed by restoring the stored value of the AR[BSP] register to the AR[BSP] register. Then, in step 908, the number of output registers in the stack frame current at the time the first cover instruction was issued is computed from the CFM value stored in memory in step 902. Next, in step 910, an artificial AR[PFS] value is computed with sof and sol fields equal to the number of output registers in the original stack frame, computed in step 908. Then, in step 912, the artificial AR[PFS] value computed in step 910 is stored into the AR[PFS] register. In step 914, a br.ret instruction is executed. In step 916, the CFM value stored in step 902 is retrieved from memory and moved into the AR[PFS] register. Finally, in step 918, a second br.ret instruction is executed to fully restore the register-stack and processor states to the states that existed at the time the original cover instruction was issued, in step 904.

Although the present invention has been described in terms of a particular embodiment, it is not intended that the invention be limited to this embodiment. Modifications within the spirit of the invention will be apparent to those skilled in the art. For example, any number of different assembly-language subroutines may be devised to implement the described embodiment of the present invention, and the unprivileged cover-instruction method of the described embodiment of the present invention may in turn be embodied in many different types of systems, including application-level thread supervisors. The described embodiment may also be employed in computer systems using processors other than the IA-64 processors which provide analogous RSE functionality and cover instructions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method, carried out by unprivileged code, for recovering states of a register-stack and a processor following execution of a cover instruction, the method comprising:
   running, at a privilege level less privileged than a highest privilege level, in a context of an original stack frame allocated on the register stack;
   prior to executing the cover instruction, storing a description of the original stack frame in memory;
   executing, at a privilege level less privileged than a highest privilege level, the cover instruction; and
   subsequently,
      re-initializing the register stack; and
      allocating a new stack frame equivalent to the original stack frame.

2. The method of claim 1 wherein storing a description of the original stack frame in memory further comprises:
   storing the contents of a previous-stack-frame register into memory.

3. The method of claim 1 further including, following execution of the cover instruction:
   storing the contents of a backing-store-pointer register in memory.

4. The method of claim 3 wherein subsequently re-initializing the register stack and allocating a new stack frame equivalent to the original stack frame further includes:
   executing a cover instruction;
   moving the contents of the backing-store-pointer register stored in memory into the backing-store-pointer register;
   computing a number of output registers in the original stack frame;
   constructing a previous-stack-frame register value with total size and local-portion size values both equal to the computed number of output registers in the original stack frame;
   copying the constructed previous-stack-frame register value into the previous-stack-frame register;
   executing a first branch-return instruction;
   copying the stored contents of the previous-stack-frame register from memory into the previous-stack-frame register; and
   executing a second branch-return instruction.

5. The method of claim 1 embodied in a multi-threaded application supervisor.

6. Computer instructions encoding the method of claim 1 stored in a computer-readable medium.

7. A system that recovers states of a register-stack and a processor following execution of a cover instruction by unprivileged code, the system recovering states of a register-stack and a processor following execution of a cover instruction by:
   executing unprivileged code, at a privilege level less privileged than a highest privilege level, in a context of an original stack frame allocated on the register stack;
   prior to executing the cover instruction, storing a description of the original stack frame in memory;
   executing, at a privilege level less privileged than a highest privilege level, the cover instruction; and
   subsequently,
      re-initializing the register stack; and
      allocating a new stack frame equivalent to the original stack frame.

8. The system of claim 7 wherein storing a description of the original stack frame in memory further comprises:
   storing the contents of a previous-stack-frame register into memory.

9. The system of claim 7 further including, following execution of the cover instruction:
   storing the contents of a backing-store-pointer register in memory.

10. The system of claim 9 wherein subsequently re-initializing the register stack and allocating a new stack frame equivalent to the original stack frame further includes:
   executing a cover instruction;
   moving the contents of the backing-store-pointer register stored in memory into the backing-store-pointer register;
   computing a number of output registers in the original stack frame;
   constructing a previous-stack-frame register value with total size and local-portion size values both equal to the computed number of output registers in the original stack frame;
   copying the constructed previous-stack-frame register value into the previous-stack-frame register;
   executing a first branch-return instruction;
   copying the stored contents of the previous-stack-frame register from memory into the previous-stack-frame register; and
   executing a second branch-return instruction.

* * * * *

UNITED STATES PATENT AND TRADEMARK OFFICE
CERTIFICATE OF CORRECTION

| | | |
|---|---|---|
| PATENT NO. | : 7,203,822 B2 | Page 1 of 1 |
| APPLICATION NO. | : 10/909802 | |
| DATED | : April 10, 2007 | |
| INVENTOR(S) | : Robert D. Gardner | |

It is certified that error appears in the above-identified patent and that said Letters Patent is hereby corrected as shown below:

In column 1, line 16, delete "modem" and insert -- modern --, therefor.

In column 5, line 4, delete "modem" and insert -- modern --, therefor.

In column 6, line 6, delete "$GR_3$," and insert -- $GR_{31}$ --, therefor.

Signed and Sealed this

Thirteenth Day of January, 2009

JON W. DUDAS
*Director of the United States Patent and Trademark Office*